US012798248B2

(12) United States Patent
Kamiyama

(10) Patent No.: US 12,798,248 B2
(45) Date of Patent: Nov. 17, 2026

(54) CLEANING LIQUID SUPPLYING APPARATUS, LIQUID EJECTING APPARATUS, AND METHOD OF CONTROLLING CLEANING LIQUID SUPPLYING APPARATUS

(71) Applicant: SEIKO EPSON CORPORATION, Tokyo (JP)

(72) Inventor: Nobuaki Kamiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 206 days.

(21) Appl. No.: 18/641,538

(22) Filed: Apr. 22, 2024

(65) Prior Publication Data

US 2024/0359468 A1 Oct. 31, 2024

(30) Foreign Application Priority Data

Apr. 25, 2023 (JP) ................................ 2023-071734
Apr. 25, 2023 (JP) ................................ 2023-071735

(51) Int. Cl.
*B41J 2/165* (2006.01)

(52) U.S. Cl.
CPC ....... *B41J 2/16552* (2013.01); *B41J 2/16535* (2013.01); *B41J 2002/16558* (2013.01); *B41J 2002/16594* (2013.01)

(58) Field of Classification Search
CPC ................ B41J 2/16535; B41J 2/16552; B41J 2002/16558; B41J 2002/16594; B41J 2/16517; B41J 2/16588; B41J 2025/008
See application file for complete search history.

(56) References Cited

U.S. PATENT DOCUMENTS

2017/0274660 A1* 9/2017 Hamamoto .......... B41J 2/16538

FOREIGN PATENT DOCUMENTS

JP 2017-170700 A 9/2017

* cited by examiner

*Primary Examiner* — Douglas Lee
(74) *Attorney, Agent, or Firm* — WORKMAN NYDEGGER

(57) ABSTRACT

A cleaning liquid supplying apparatus includes a first reservoir unit, a second reservoir unit of a pressure accumulation type, a supply flow path, a pump, a return flow path, a flow path valve, an atmospheric relief valve, a control unit, a plurality of cleaning liquid ejecting units, a pressure detection unit, and a determination unit. The first reservoir unit is provided at a position lower than a position of the second reservoir unit in the gravity direction, and when the determination unit determines that an amount of air is abnormal, after the cleaning liquid stored in the second reservoir unit is discharged to the first reservoir unit until a liquid level of the cleaning liquid stored in the second reservoir unit reaches a reference liquid level, the control unit causes the cleaning liquid to be delivered from the first reservoir unit to the second reservoir unit again.

13 Claims, 7 Drawing Sheets

CLEANING LIQUID SUPPLYING APPARATUS, LIQUID EJECTING APPARATUS, AND METHOD OF CONTROLLING CLEANING LIQUID SUPPLYING APPARATUS

The present application is based on, and claims priority from JP Application Serial Number 2023-071734, filed Apr. 25, 2023, and JP Application Serial Number 2023-071735, filed Apr. 25, 2023, the disclosures of which are hereby incorporated by reference herein in their entirety.

BACKGROUND

1. Technical Field

The present disclosure relates to a cleaning liquid supplying apparatus, a liquid ejecting apparatus including the cleaning liquid supplying apparatus, and a method of controlling the cleaning liquid supplying apparatus.

2. Related Art

For example, as in JP-A-2017-170700, there is a liquid droplet ejecting apparatus which is an example of a liquid ejecting apparatus that performs printing by ejecting UV ink which is an example of a functional liquid from a plurality of liquid droplet ejecting heads. The liquid droplet ejecting apparatus includes a cleaning liquid supplying apparatus. The cleaning liquid supplying apparatus causes a cleaning liquid to adhere to the plurality of liquid droplet ejecting heads by ejecting the cleaning liquid from a plurality of cleaning liquid ejecting units.

The cleaning liquid supplying apparatus includes a first reservoir unit, a second reservoir unit, a cleaning liquid pump which is an example of a pump, and a pressure detection unit. The cleaning liquid supplying apparatus replenishes the cleaning liquid from the first reservoir unit to the second reservoir unit by driving the cleaning liquid pump. The cleaning liquid supplying apparatus drives the cleaning liquid pump when pressure of the second reservoir unit reaches a lower limit threshold value. The cleaning liquid supplying apparatus stops the cleaning liquid pump when the pressure of the second reservoir unit reaches an upper limit threshold value. The cleaning liquid supplying apparatus ejects the cleaning liquid from the plurality of liquid droplet ejecting heads by the pressure accumulated in the second reservoir unit.

When the cleaning liquid is ejected and pressure of the second reservoir unit lowers, the pressure of the second reservoir unit can be returned to pressure at which the cleaning liquid can be ejected by approximately the same amount of the cleaning liquid as the ejected amount being supplied to the second reservoir unit. However when an amount of air in the second reservoir unit decreases, for example, due to leakage or the like, the ejecting amount of the cleaning liquid decreases.

SUMMARY

A cleaning liquid supplying apparatus that solves the above problem includes a first reservoir unit configured to store a cleaning liquid, a second reservoir unit of a pressure accumulation type configured to form an air reservoir inside when the second reservoir unit stores the cleaning liquid, a supply flow path through which the cleaning liquid stored in the first reservoir unit is delivered to the second reservoir unit, a pump provided in the supply flow path, a return flow path through which the cleaning liquid stored in the second reservoir unit is discharged to the first reservoir unit, a flow path valve provided in the return flow path, an atmospheric relief valve configured to open the second reservoir unit to the atmosphere, a control unit configured to control the pump, the flow path valve, and the atmospheric relief valve and control pressure accumulation and accumulated pressure release in the second reservoir unit, a plurality of cleaning liquid ejecting units configured to eject the cleaning liquid stored in the second reservoir unit, a pressure detection unit configured to detect pressure inside the second reservoir unit, and a determination unit configured to determine abnormality in an amount of air in the second reservoir unit, based on an amount of change in the pressure per unit time. The first reservoir unit is provided at a position lower than a position of the second reservoir unit in the gravity direction, when the determination unit determines that the amount of air is abnormal, after the cleaning liquid stored in the second reservoir unit is discharged to the first reservoir unit until a liquid level of the cleaning liquid stored in the second reservoir unit reaches a reference liquid level, the control unit causes the cleaning liquid to be delivered from the first reservoir unit to the second reservoir unit again.

A cleaning liquid supplying apparatus that solves the above problem includes a first reservoir unit configured to store a cleaning liquid, a second reservoir unit of a pressure accumulation type configured to form an air reservoir inside when the second reservoir unit stores the cleaning liquid, a communication flow path through which the first reservoir unit and the second reservoir unit communicate, a reversible pump provided in the communication flow path and configured to deliver a liquid from the first reservoir unit to the second reservoir unit and deliver a liquid from the second reservoir unit to the first reservoir unit, an atmospheric relief valve configured to open the second reservoir unit to the atmosphere, a control unit configured to control the reversible pump and control pressure accumulation and accumulated pressure release in the second reservoir unit, a plurality of cleaning liquid ejecting units configured to eject the cleaning liquid stored in the second reservoir unit, a pressure detection unit configured to detect pressure inside the second reservoir unit, and a determination unit configured to determine abnormality in an amount of air in the second reservoir unit, based on an amount of change in the pressure per unit time. When the determination unit determines that the amount of air is abnormal, after the cleaning liquid stored in the second reservoir unit is discharged to the first reservoir unit until a liquid level of the cleaning liquid stored in the second reservoir unit reaches a reference liquid level, the control unit causes the cleaning liquid to be delivered from the first reservoir unit to the second reservoir unit again.

A cleaning liquid supplying apparatus that solves the above problem includes a first reservoir unit configured to store a cleaning liquid, a second reservoir unit of a pressure accumulation type configured to form an air reservoir inside when the second reservoir unit stores the cleaning liquid, a supply flow path through which the cleaning liquid stored in the first reservoir unit is delivered to the second reservoir unit, a first pump provided in the supply flow path, a return flow path through which the cleaning liquid stored in the second reservoir unit is discharged to the first reservoir unit, a second pump, a flow path valve provided in the return flow path, an atmospheric relief valve configured to open the second reservoir unit to the atmosphere, a control unit configured to control the first pump, the second pump, the flow path valve, and the atmospheric relief valve and control pressure accumulation and accumulated pressure release in the second reservoir unit, a plurality of cleaning liquid ejecting units configured to eject the cleaning liquid stored in the second reservoir unit, a pressure detection unit configured to detect pressure inside the second reservoir unit, and a determination unit configured to determine abnormality in an amount of air in the second reservoir unit, based on an amount of change in the pressure per unit time. When the determination unit determines that the amount of air is abnormal, after the cleaning liquid stored in the second reservoir unit is discharged to the first reservoir unit until a liquid level of the cleaning liquid stored in the second reservoir unit reaches a reference liquid level, the control unit causes the cleaning liquid to be delivered from the first reservoir unit to the second reservoir unit again.

A liquid ejecting apparatus that solves the above problem includes the cleaning liquid supplying apparatus having the configuration described above, a plurality of liquid droplet ejecting heads each configured to eject a functional liquid and provided correspondingly to the plurality of cleaning liquid ejecting units, and a plurality of wiping apparatuses configured to wipe a nozzle surface of each of the liquid droplet ejecting heads. Each of the cleaning liquid ejecting units sprays a cleaning liquid to each of the liquid droplet ejecting heads.

A method of controlling a cleaning liquid supplying apparatus that solves the above problem includes a cleaning liquid supplying apparatus including a first reservoir unit storing a cleaning liquid, a second reservoir unit of a pressure accumulation type forming an air reservoir inside when the second reservoir unit stores the cleaning liquid, a supply flow path through which the cleaning liquid stored in the first reservoir unit is delivered to the second reservoir unit, a pump provided in the supply flow path, a return flow path through which the cleaning liquid stored in the second reservoir unit is discharged to the first reservoir unit, a flow path valve provided in the return flow path, an atmospheric relief valve opening the second reservoir unit to the atmosphere, and a plurality of cleaning liquid ejecting units ejecting the cleaning liquid stored in the second reservoir unit, the first reservoir unit being provided at a position lower than a position of the second reservoir unit in the gravity direction. The method of controlling the cleaning liquid supplying apparatus includes detecting pressure inside the second reservoir unit, determining abnormality in an amount of air in the second reservoir unit, based on an amount of change in the pressure per unit time, and when the amount of air is determined to be abnormal, after the cleaning liquid stored in the second reservoir unit is discharged to the first reservoir unit until a liquid level of the cleaning liquid stored in the second reservoir unit reaches a reference liquid level, delivering the cleaning liquid from the first reservoir unit to the second reservoir unit again.

DESCRIPTION OF EMBODIMENTS

First Embodiment

Figure 1:
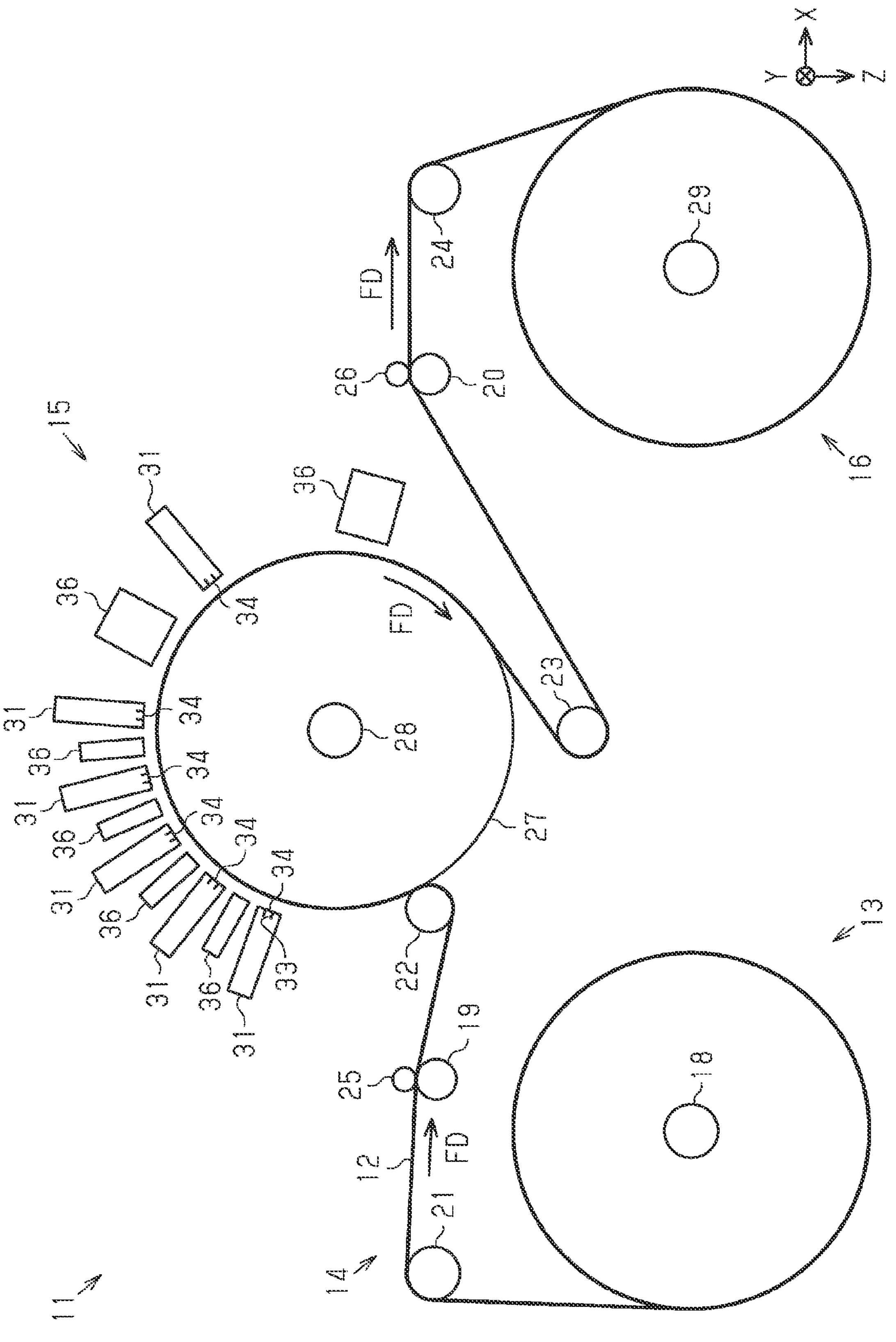
FIG. 1 is a schematic view of a liquid ejecting apparatus according to a first embodiment.

Hereinafter, a cleaning liquid supplying apparatus, a liquid ejecting apparatus, and a method of controlling the cleaning liquid supplying apparatus according to a first embodiment will be described with reference to the accompanying drawings. The liquid ejecting apparatus is, for example, an ink jet printer that performs printing by ejecting ink which is an example of a functional liquid onto a medium such as paper, fabric, vinyl, a plastic component, or a metal component.

In the drawings, assuming that a liquid ejecting apparatus 11 is placed on a horizontal plane, a direction of gravity is indicated by a Z-axis, and directions along the horizontal plane are indicated by an X-axis and a Y-axis. The X-axis, the Y-axis, and the Z-axis are orthogonal to each other. In the following description, the X-axis direction is also referred to as a horizontal direction X, the Y-axis direction as a width direction Y, and the Z-axis direction as the gravity direction Z. The width direction Y is also a direction of the width of a long medium 12.

As illustrated in FIG. 1, the liquid ejecting apparatus 11 may include a feeding unit 13, a transport unit 14, a printing unit 15, and a winding unit 16. The liquid ejecting apparatus 11 performs printing by transporting the medium 12 in a transport direction FD. The transport direction FD is a direction along a transport path of the medium 12. The transport direction FD is a direction from the feeding unit 13 toward the winding unit 16.

The feeding unit 13 includes a feeding shaft 18. The feeding shaft 18 extends, for example, in the width direction Y. The feeding shaft 18 is provided to be rotatable by being driven by a feeding motor (not illustrated). The long medium 12 is supported by the feeding shaft 18 so as to be integrally rotatable with the feeding shaft 18 in a state of being wound in a roll shape in advance. The medium 12 is wound with a printing surface, which is a surface on which printing is performed, facing outward. The feeding shaft 18 rotates in a clockwise direction in FIG. 1 and feeds the medium 12.

The transport unit 14 may include a first drive roller 19 and a second drive roller 20. The transport unit 14 may include a first driven roller 21, a second driven roller 22, a third driven roller 23, and a fourth driven roller 24. The transport unit 14 may include a first nip roller 25, a second nip roller 26, a support drum 27, and a rotation shaft 28.

The first drive roller 19 and the second drive roller 20 are rotated by driving of a motor (not illustrated) to transport the medium 12. A plurality of minute protrusions may be provided on outer peripheral surfaces of the first drive roller 19 and the second drive roller 20. The minute protrusions may be formed by, for example, thermal spraying in which melted particles are sprayed. The first driven roller 21 to the fourth driven roller 24 are driven to rotate with respect to the medium 12 which is transported.

The first nip roller 25 presses the medium 12 against the first drive roller 19. When the first nip roller 25 is provided, it is easy to ensure frictional force between the first drive roller 19 and the medium 12. Similarly, the second nip roller 26 presses the medium 12 against the second drive roller 20. When the second nip roller 26 is provided, it is easy to ensure frictional force between the second drive roller 20 and the medium 12.

The support drum 27 has a cylindrical shape. The support drum 27 supports the medium 12. Specifically, the medium 12 is wound around the support drum 27 in a state in which tension is applied. The medium 12 is supported on an outer peripheral surface of the support drum 27. The support drum 27 may be provided rotatably about the rotation shaft 28 extending in the width direction Y. The support drum 27 may be driven to rotate or may be rotated by driving of a transport motor (not illustrated) to transport the medium 12.

The medium 12 fed from the feeding unit 13 is wound around the first driven roller 21, the first drive roller 19, the second driven roller 22, the support drum 27, the third driven roller 23, the second drive roller 20, and the fourth driven roller 24 in this order and is fed to the winding unit 16. When the medium 12 is wound around the second driven roller 22 and the third driven roller 23 adjacent to the support drum 27 in the transport direction FD so as to be folded back, a region supported by the support drum 27 is increased.

The winding unit 16 includes a winding shaft 29. The winding shaft 29 extends, for example, in the width direction Y. The winding shaft 29 is provided rotatably by being driven by a winding motor (not illustrated). The medium 12 is passed through the transport path in advance, and a downstream end of the medium 12 in the transport direction FD is wound around the winding shaft 29. The winding shaft 29 rotates in a clockwise direction in FIG. 1 and winds the medium 12. The medium 12 is wound with the printed surface facing outward.

The printing unit 15 includes a plurality of liquid droplet ejecting heads 31. Each of the plurality of liquid droplet ejecting heads 31 ejects a functional liquid. The liquid droplet ejecting head 31 ejects the functional liquid onto the medium 12 supported by the support drum 27. Each of the plurality of liquid droplet ejecting heads 31 has the same configuration, but differs in the type of functional liquid ejected. The liquid droplet ejecting head 31 is a so-called line head configured to simultaneously eject the functional liquid over the width direction Y of the medium 12. One liquid droplet ejecting head 31 may eject one type of functional liquid or may eject a plurality of types of functional liquids. The functional liquid ejected by the liquid droplet ejecting head 31 of the present embodiment is an ultraviolet curable ink which is cured by reacting with ultraviolet rays.

The liquid droplet ejecting head 31 has a nozzle surface 34 in which a plurality of nozzles 33 is opened. The liquid droplet ejecting head 31 ejects liquid droplets from the nozzles 33. The liquid droplet ejecting head 31 ejects the functional liquid in a direction perpendicular to the nozzle surface 34.

The printing unit 15 may include one or more lights 36. The light 36 cures the functional liquid attached to the medium 12 by irradiating the medium 12 with ultraviolet rays. The light 36 fixes the functional liquid on the surface of the medium 12.

Figure 2:
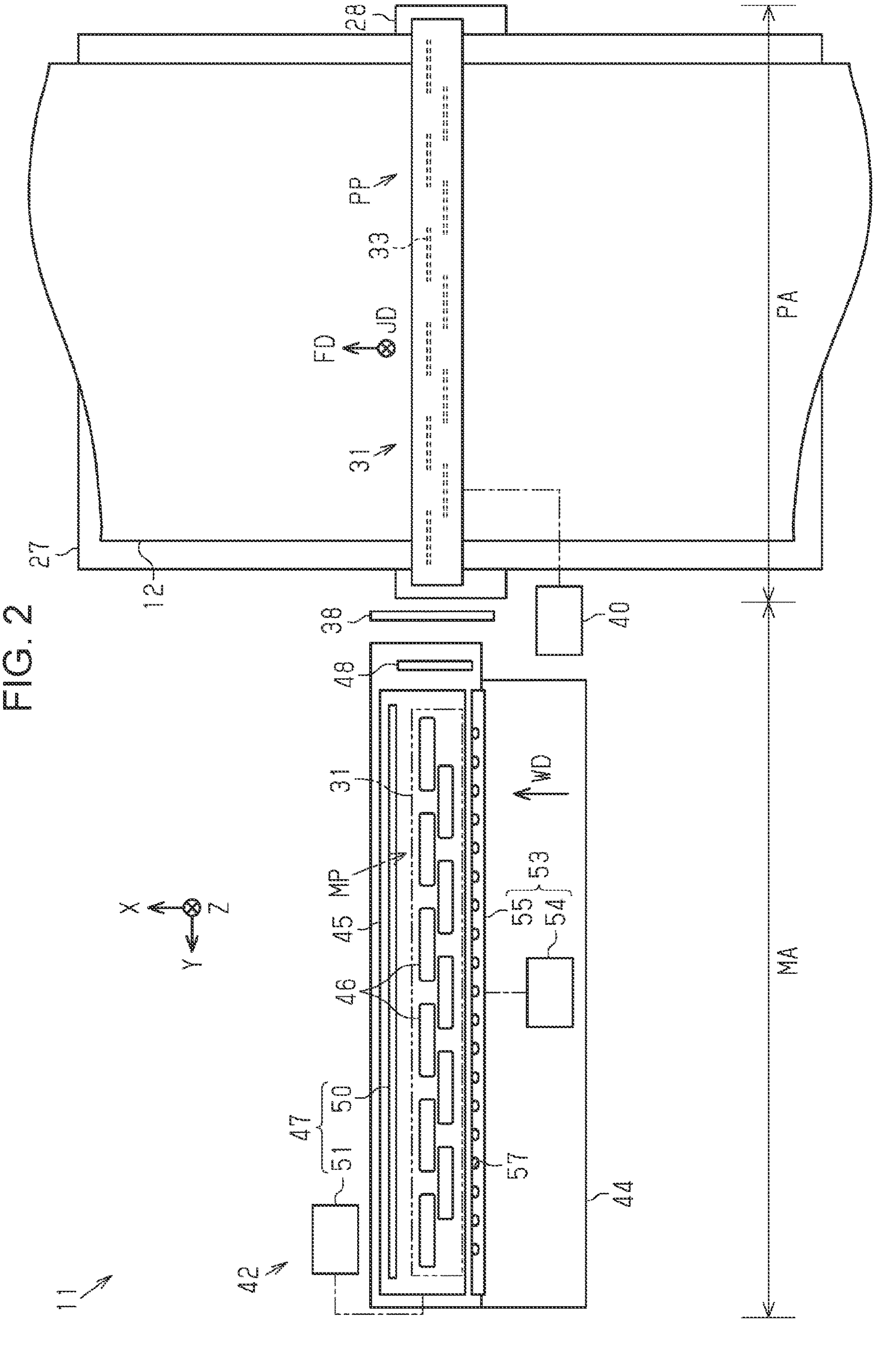
FIG. 2 is a schematic view of a wiping apparatus.

As illustrated in FIG. 2, the liquid ejecting apparatus 11 has a printing region PA and a maintenance region MA.

The printing region PA is a region in which printing is performed on the medium 12. The maintenance region MA is a region in which maintenance of the liquid droplet ejecting head 31 is performed. The maintenance region MA is adjacent to the printing region PA in the width direction Y.

The liquid ejecting apparatus 11 may include one or more shielding plates 38. The shielding plate 38 blocks ultraviolet rays. The shielding plate 38 may divide the printing region PA and the maintenance region MA. The printing region PA is a region closer to a side of the support drum 27 than the shielding plate 38 in the width direction Y. The maintenance region MA is a region opposite to the support drum 27 with respect to the shielding plate 38.

The liquid ejecting apparatus 11 may include a head moving mechanism 40. The head moving mechanism 40 moves the liquid droplet ejecting head 31. The head moving mechanism 40 may move the plurality of liquid droplet ejecting heads 31 collectively or individually. The head moving mechanism 40 reciprocates the liquid droplet ejecting head 31 in the width direction Y. The liquid droplet ejecting head 31 moves in the width direction Y from a printing position PP indicated by a solid line in FIG. 2 in the printing region PA, and reaches a maintenance position MP indicated by a two-dot chain line in FIG. 2 in the maintenance region MA. The head moving mechanism 40 may reciprocate the liquid droplet ejecting head 31 in an ejection direction JD perpendicular to the nozzle surface 34.

Wiping Apparatus

As illustrated in FIG. 2, the liquid ejecting apparatus 11 includes a plurality of wiping apparatuses 42. The wiping apparatus 42 is provided in the same number as the liquid droplet ejecting heads 31 so as to individually correspond to the plurality of liquid droplet ejecting heads 31. Each of the plurality of wiping apparatuses 42 has the same configuration. Therefore, in FIG. 2, one liquid droplet ejecting head 31 and one corresponding wiping apparatus 42 are illustrated, and other liquid droplet ejecting heads 31 and other wiping apparatuses 42 are not illustrated.

The plurality of wiping apparatuses 42 is provided in the maintenance region MA. The plurality of wiping apparatuses 42 wipes the nozzle surface 34 of each liquid droplet ejecting head 31. The wiping apparatus 42 may include a case 44, a support unit 45, a cap 46, a first cleaning unit 47, and a second cleaning unit 48.

The support unit 45 may support the cap 46 and the first cleaning unit 47.

The cap 46 may cap the liquid droplet ejecting head 31 by coming into contact with the liquid droplet ejecting head 31 that moved in the ejection direction JD from the maintenance position MP.

The first cleaning unit 47 may include a wiping unit 50 and a wiping unit moving mechanism 51. The wiping unit 50 may be formed of deformable rubber. The wiping unit moving mechanism 51 moves the wiping unit 50. The wiping unit moving mechanism 51 of the present embodiment causes the cap 46 and the wiping unit 50 to reciprocate in a wiping direction WD by moving the support unit 45. The wiping direction WD may be a direction along the nozzle surface 34. The wiping unit moving mechanism 51 causes the wiping unit 50 to wipe the nozzle surface 34 by moving the wiping unit 50 in the wiping direction WD in a state where the liquid droplet ejecting head 31 is positioned at the maintenance position MP.

The second cleaning unit 48 may be formed of an absorbing member configured to absorb a liquid such as a cleaning liquid or a functional liquid. For example, the second cleaning unit 48 may wipe a side surface of the liquid droplet ejecting head 31 when the liquid droplet ejecting head 31 moves from the maintenance region MA to the printing region PA.

Cleaning Liquid Supplying Apparatus

As illustrated in FIG. 2, the liquid ejecting apparatus 11 includes a cleaning liquid supplying apparatus 53. The cleaning liquid supplying apparatus 53 includes a supply mechanism 54 and a plurality of cleaning liquid ejecting units 55. One cleaning liquid ejecting unit 55 is illustrated in FIG. 2. The cleaning liquid supplying apparatus 53 may include the same number of cleaning liquid ejecting units 55 as the liquid droplet ejecting heads 31. That is, the plurality of cleaning liquid ejecting units 55 and the plurality of liquid droplet ejecting heads 31 are provided correspondingly to each other.

Each of the cleaning liquid ejecting units 55 sprays the cleaning liquid to each of the liquid droplet ejecting heads 31. The cleaning liquid ejecting unit 55 may spray the cleaning liquid to a side surface of the liquid droplet ejecting head 31 positioned at the maintenance position MP. The cleaning liquid ejecting unit 55 is, for example, a pipe in which one or more ejection ports 57 are formed. The cleaning liquid ejecting unit 55 can eject the cleaning liquid from the ejection port 57. The plurality of ejection ports 57 may be arranged in the width direction Y.

As the cleaning liquid, pure water may be adopted, or a liquid obtained by adding an additive to pure water may be adopted. Examples of the additive include a resin, a preservative, an antifoaming agent, a humectant, a penetrant, a surfactant, an organic solvent and a pH adjuster. Each component described above may be used alone or in combination of two or more, and the content thereof is not particularly limited. When the functional liquid ejected by the liquid droplet ejecting head 31 is an ultraviolet curable ink, a solvent that can dissolve the cured ink may be adopted as the cleaning liquid, or a transparent ultraviolet curable ink may be adopted as the cleaning liquid. The solvent that can dissolve the ultraviolet curable ink is, for example, Ethyl Di Glycol Acetate (EDGAC), and a surfactant or a polymerization inhibitor may be added to the solvent.

Figure 3:
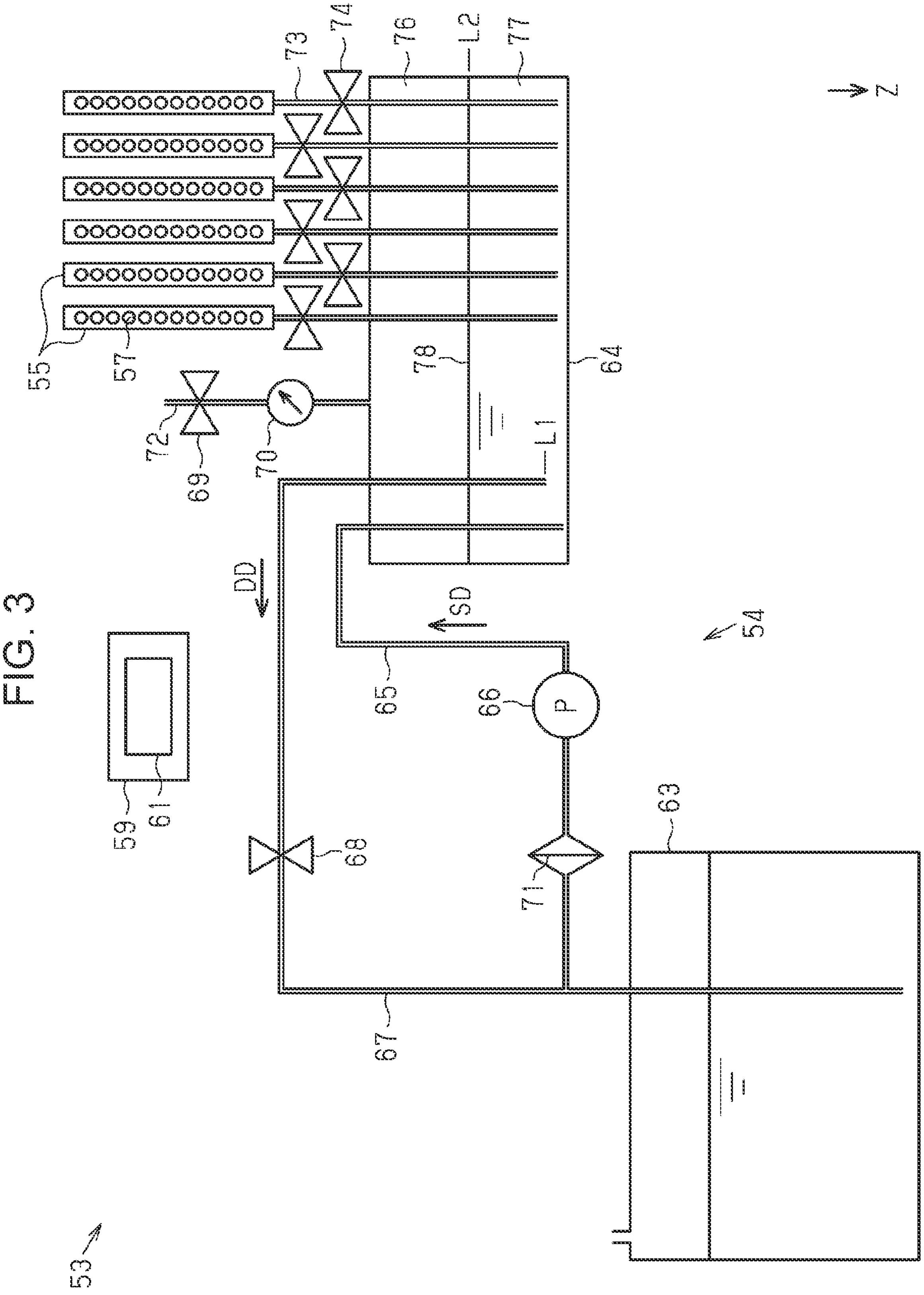
FIG. 3 is a schematic view of a cleaning liquid supplying apparatus.

As illustrated in FIG. 3, the cleaning liquid supplying apparatus 53 includes a control unit 59. The control unit 59 integrally controls driving of each mechanism in the cleaning liquid supplying apparatus 53, and controls various operations performed in the cleaning liquid supplying apparatus 53. The cleaning liquid supplying apparatus 53 may integrally control driving of each mechanism in the liquid ejecting apparatus 11.

The control unit 59 may be configured as a circuit including a: one or more processors that execute various processes in accordance with a computer program, β: one or more dedicated hardware circuits that execute at least some of the various processes, or γ: a combination thereof. The hardware circuit is, for example, an application specific integrated circuit. The processor includes a CPU and memory, such as RAM and ROM, and the memory stores program codes or instructions configured to cause the CPU to perform processes. The memory, in other words, a computer-readable medium, includes any readable medium that can be accessed by a general purpose or dedicated computer.

The control unit 59 may function as a determination unit 61 by executing a program stored in the memory. Therefore, it can be said that the cleaning liquid supplying apparatus 53 includes the determination unit 61.

The supply mechanism 54 supplies the cleaning liquid to the plurality of cleaning liquid ejecting units 55. The supply mechanism 54 may include a first reservoir unit 63, a second reservoir unit 64, a supply flow path 65, a pump 66, a return flow path 67, a flow path valve 68, an atmospheric relief valve 69, and a pressure detection unit 70. The supply mechanism 54 may include a filter 71, an atmospheric relief path 72, a plurality of individual flow paths 73, and a plurality of individual valves 74.

The first reservoir unit 63 stores the cleaning liquid. The first reservoir unit 63 is provided at a position lower than the second reservoir unit 64 in the gravity direction Z. The first reservoir unit 63 is, for example, an open tank made of stainless steel.

The second reservoir unit 64 stores the cleaning liquid supplied from the first reservoir unit 63. The second reservoir unit 64 is a pressure accumulation type. The second reservoir unit 64 is, for example, a sealed tank made of stainless steel. When the second reservoir unit 64 stores the cleaning liquid, an air reservoir 76 is formed inside. In the second reservoir unit 64 of the present embodiment, the air reservoir 76 is formed in an upper portion, and a liquid reservoir 77 is formed in a lower portion. In the second reservoir unit 64, the cleaning liquid is supplied and a liquid level 78 rises, and the air reservoir 76 is compressed, whereby internal pressure rises.

The supply flow path 65 may be formed of a tube. The supply flow path 65 couples the first reservoir unit 63 and the second reservoir unit 64. In a supply direction SD, an upstream end of the supply flow path 65 may be inserted into the first reservoir unit 63 and may be located near a bottom surface of the first reservoir unit 63. The upstream end of supply flow path 65 may be coupled to the bottom surface or a side surface of the first reservoir unit 63. A downstream end of the supply flow path 65 may be inserted into the second reservoir unit 64 and located near a bottom surface of the second reservoir unit 64. The downstream end of the supply flow path 65 may be coupled to the bottom surface or a side surface of the second reservoir unit 64. The supply flow path 65 delivers the cleaning liquid stored in the first reservoir unit 63 to the second reservoir unit 64.

The filter 71 and the pump 66 are provided in the supply flow path 65. The filter 71 is provided between the pump 66 and the first reservoir unit 63 in the supply flow path 65. The filter 71 is provided upstream of the pump 66 in the supply direction SD. The filter 71 captures air bubbles, foreign matters, and the like contained in the cleaning liquid. The pump 66 delivers a fluid in the supply flow path 65 in the supply direction SD. The pump 66 delivers the cleaning liquid from the first reservoir unit 63 to the second reservoir unit 64.

The return flow path 67 may be formed of a tube. The return flow path 67 couples the first reservoir unit 63 and the second reservoir unit 64. In a discharge direction DD, an upstream end of the return flow path 67 may be inserted into the second reservoir unit 64 and may be located near the bottom surface of the second reservoir unit 64. The upstream end of the return flow path 67 may be coupled to the bottom surface or the side surface of the second reservoir unit 64. In the present embodiment, the height of the upstream end of the return flow path 67 is also referred to as a reference liquid level L1. The reference liquid level L1 may be a position higher in the gravity direction Z than the position of the downstream end of the supply flow path 65.

A downstream end of the return flow path 67 may be coupled to the supply flow path 65. The return flow path 67 may be coupled to the supply flow path 65 between the filter 71 and the first reservoir unit 63. The return flow path 67 discharges the cleaning liquid stored in the second reservoir unit 64 to the first reservoir unit 63. Specifically, the cleaning liquid stored in the second reservoir unit 64 is discharged from the return flow path 67 to the first reservoir unit 63 through the supply flow path 65. A part of the return flow path 67 is positioned above the reference liquid level L1 in the gravity direction Z. A part of the return flow path 67 of the present embodiment is positioned above the second reservoir unit 64.

The flow path valve 68 is provided in the return flow path 67.

The atmospheric relief path 72 may be formed of a tube. One end of the atmospheric relief path 72 is coupled to the second reservoir unit 64, and the other end is opened to the atmosphere. The other end of the atmospheric relief path 72 may be coupled to the first reservoir unit 63. When the other end of the atmospheric relief path 72 is coupled to the first reservoir unit 63, the other end of the atmospheric relief path 72 is located at a position higher than the cleaning liquid in the first reservoir unit 63 and is opened to air in the first reservoir unit 63.

The atmospheric relief valve 69 may be provided in the atmospheric relief path 72. The atmospheric relief valve 69 can open the second reservoir unit 64 to the atmosphere. The atmospheric relief valve 69 brings the inside of the second reservoir unit 64 to the atmospheric pressure by opening the atmospheric relief path 72.

The pressure detection unit 70 may be provided in the atmospheric relief path 72. The pressure detection unit 70 may be provided between the atmospheric relief valve 69 and the second reservoir unit 64. The pressure detection unit 70 detects pressure inside the second reservoir unit 64.

Each of the plurality of individual flow paths 73 may be formed of a tube. The individual flow path 73 couples the second reservoir unit 64 and the cleaning liquid ejecting unit 55. An upstream end of the individual flow path 73 may be inserted into the second reservoir unit 64, or may be coupled to the bottom surface or the side surface of the second reservoir unit 64. The upstream end of the individual flow path 73 may be located at a position lower than the reference liquid level L1 in the gravity direction Z.

The plurality of individual valves 74 is provided in the individual flow paths 73, respectively. When the individual valve 74 opens the individual flow path 73, the cleaning liquid in the second reservoir unit 64 is delivered to the cleaning liquid ejecting unit 55 passing through the individual flow path 73 and is ejected from the ejection port 57 by the pressure accumulated in the second reservoir unit 64. The plurality of cleaning liquid ejecting unit 55 ejects the cleaning liquid stored in the second reservoir unit 64.

Control Method of Cleaning Liquid Supplying Apparatus

The control unit 59 controls the pump 66, the flow path valve 68, and the atmospheric relief valve 69, and controls pressure accumulation and accumulated pressure release in the second reservoir unit 64. When the power of the liquid ejecting apparatus 11 is turned off, the flow path valve 68 and the atmospheric relief valve 69 may be opened. When the power of the liquid ejecting apparatus 11 is turned off, the plurality of individual valves 74 may be closed.

When the power of the liquid ejecting apparatus 11 is turned on, the control unit 59 performs a supply operation to accumulate pressure in the second reservoir unit 64. In the supply operation, the control unit 59 closes the flow path valve 68 and the atmospheric relief valve 69. The control unit 59 drives the pump 66 in a state where the flow path valve 68, the atmospheric relief valve 69, and all of the individual valves 74 are closed. The pump 66 delivers the cleaning liquid from the first reservoir unit 63 to the second reservoir unit 64.

When the cleaning liquid flows into the second reservoir unit 64, the air reservoir 76 becomes smaller as the liquid level 78 rises. That is, the pressure in the second reservoir unit 64 is raised by compressing the air. When the pressure inside the second reservoir unit 64 detected by the pressure detection unit 70 reaches an upper limit threshold value, the control unit 59 stops driving of the pump 66.

When the cleaning liquid ejecting unit 55 ejects the cleaning liquid, the pressure in the second reservoir unit 64 lowers. When the pressure inside the second reservoir unit 64 detected by the pressure detection unit 70 reaches a lower limit threshold value, the control unit 59 performs the supply operation again. Specifically, the control unit 59 drives the pump 66. The lower limit threshold value may be the minimum pressure at which the cleaning liquid in the second reservoir unit 64 can be supplied to the cleaning liquid ejecting unit 55 and sprayed to the liquid droplet ejecting head 31.

When the pump 66 is driven, the flow path valve 68, the atmospheric relief valve 69, and all of the individual valves 74 are closed. Therefore, the air inside the second reservoir unit 64 is compressed by the supplied cleaning liquid, and the pressure rises. When the pressure inside the second reservoir unit 64 detected by the pressure detection unit 70 reaches the upper limit threshold value, the control unit 59 stops driving of the pump 66. Thus, the pressure inside the second reservoir unit 64 is maintained between the lower limit threshold value and the upper limit threshold value.

For example, when the power of the liquid ejecting apparatus 11 is turned off, the control unit 59 performs a discharge operation. The control unit 59 causes the cleaning liquid in the second reservoir unit 64 to be discharged to the first reservoir unit 63. Specifically, the control unit 59 opens the flow path valve 68 and then opens the atmospheric relief valve 69 after a standby time elapses.

When the flow path valve 68 is opened, the cleaning liquid in the second reservoir unit 64 is pushed out to the return flow path 67 by the pressure accumulated in the second reservoir unit 64.

The pressure in the second reservoir unit 64 lowers as the cleaning liquid is discharged from the second reservoir unit 64. When the pressure in the second reservoir unit 64 lowers, a flow rate of the cleaning liquid discharged from the second reservoir unit 64 lowers.

The standby time is set in accordance with, for example, a shape, a length, arrangement, and the like of the return flow path 67. The standby time is set to be longer than a time required to fill at least a portion from the upstream end of the return flow path 67 to a portion located at the highest of the return flow path 67 in the gravity direction Z with the cleaning liquid. The standby time may be longer than the time required to fill the return flow path 67 with the cleaning liquid.

When the atmospheric relief valve 69 is opened, the inside of the second reservoir unit 64 becomes an atmospheric pressure. The cleaning liquid in the second reservoir unit 64 is discharged to the first reservoir unit 63 by the principle of siphon. The cleaning liquid in the second reservoir unit 64 is discharged to the first reservoir unit 63 passing through the return flow path 67 and the supply flow path 65. The liquid level 78 is lowered to the reference liquid level L1. Specifically, when the liquid level 78 in the second reservoir unit 64 is lowered to the height of the upstream end of the return flow path 67, air flows into the return flow path 67. Therefore, the discharge of the cleaning liquid from second reservoir unit 64 is stopped.

Abnormality Determination

The pressure detection unit 70 detects pressure inside the second reservoir unit 64. The determination unit 61 determines abnormality in an amount of air in the second reservoir unit 64, based on an amount of change in pressure per unit time in the second reservoir unit 64. In the present embodiment, determination of abnormality in the amount of air in the second reservoir unit 64 is also referred to as abnormality determination. The determination unit 61 of the present embodiment determines that the amount of air is abnormal when the amount of change in pressure per unit time in the second reservoir unit 64 is large.

The determination unit 61 may perform abnormality determination during pressure accumulation. The determination unit 61 may perform abnormality determination in at least one of the pressure accumulation performed when the power of the liquid ejecting apparatus 11 is turned on and the pressure accumulation performed when the pressure in the second reservoir unit 64 becomes the lower limit threshold value.

When the power of the liquid ejecting apparatus 11 is turned on, the liquid level 78 is assumed to be at the reference liquid level L1. It is assumed that the liquid level 78 is at a lower limit liquid level L2 that is higher than the reference liquid level L1 when pressure in the second reservoir unit 64 becomes the lower limit threshold value at the time of use. However, for example, when the amount of air in the second reservoir unit 64 is small due to leakage or the like, the liquid level 78 is located at a position higher than expected. When the pump 66 is driven in a state in which the liquid level 78 is located at a position higher than expected, the pressure of the second reservoir unit 64 rises at a pace faster than expected.

For example, the determination unit 61 may acquire front pressure and rear pressure during which the pump 66 is being driven. That is, after the pump 66 is driven, the determination unit 61 acquires pressure detected by the pressure detection unit 70 as the front pressure. The determination unit 61 acquires pressure detected after a unit time from the detection of the front pressure by the pressure detection unit 70 as the rear pressure. The determination unit 61 may determine that the amount of air is abnormal when the difference between the rear pressure and the front pressure is larger than a pressure rising threshold value.

For example, the determination unit 61 may calculate the amount of change in pressure per unit time in the second reservoir unit 64, based on the front pressure before the pump 66 is driven, the rear pressure after the pump 66 is stopped, and the time that the pump 66 is driven. The determination unit 61 may determine that the amount of air is abnormal when the calculated amount of change is larger than the pressure rising threshold value. In the present embodiment, the driving of the pump 66 is interlocked with the pressure in the second reservoir unit 64. Therefore, the determination unit 61 may determine that the amount of air is abnormal when the time from the driving of the pump 66 started to the driving of the pump 66 stopped is shorter than a preset pressure rising time.

The determination unit 61 may perform abnormality determination when at least one cleaning liquid ejecting unit 55 of the plurality of cleaning liquid ejecting units 55 ejects the cleaning liquid. When the cleaning liquid is ejected in a state in which the amount of air in the second reservoir unit 64 is small, the pressure of the second reservoir unit 64 lowers at a pace faster than expected.

For example, the determination unit 61 may acquire the front pressure and the rear pressure during which the individual valve 74 is opened. That is, after the individual valve 74 is opened, the determination unit 61 acquires pressure detected by the pressure detection unit 70 as the front pressure. The determination unit 61 acquires pressure detected after a unit time from the detection of the front pressure by the pressure detection unit 70 as the rear pressure. The determination unit 61 may determine that the amount of air is abnormal when the difference between the front pressure and the rear pressure is larger than a during-ejection threshold value. The during-ejection threshold value may be set correspondingly to the number of individual valves 74 to be opened simultaneously.

For example, the determination unit 61 may calculate the amount of change in pressure per unit time in the second reservoir unit 64, based on the front pressure before the individual valve 74 is opened, the rear pressure after the individual valve 74 is closed, and the time during which the individual valve 74 is opened. The determination unit 61 may determine that the amount of air is abnormal when the calculated amount of change is larger than the during-ejection threshold value.

The determination unit 61 may perform abnormality determination when the accumulated pressure is released. For example, when the amount of air in the second reservoir unit 64 is small and the cleaning liquid in the second reservoir unit 64 is discharged, the pressure of the second reservoir unit 64 lowers at a pace faster than expected.

For example, the determination unit 61 may acquire the front pressure and the rear pressure, in a time from the flow path valve 68 opened to the atmospheric relief valve 69 opened. That is, after the flow path valve 68 is opened, the determination unit 61 acquires pressure detected by the pressure detection unit 70 as the front pressure. The determination unit 61 acquires pressure detected after a unit time from the detection of the front pressure by the pressure detection unit 70 as the rear pressure. The determination unit 61 may determine that the amount of air is abnormal when the difference between the front pressure and the rear pressure is larger than a pressure lowering threshold value.

The determination unit 61 may determine that the amount of air is abnormal when the liquid ejecting apparatus 11 is stopped in an emergency. Specifically, the control unit 59 may determine that the amount of air is abnormal when the power is turned on after an emergency stop.

For example, when the liquid ejecting apparatus 11 is stopped in an emergency by cutting off the power supplied to the liquid ejecting apparatus 11, the flow path valve 68 and the atmospheric relief valve 69 are opened. Therefore, the inside of the second reservoir unit 64 becomes an atmospheric pressure, but when the return flow path 67 is not filled with the cleaning liquid, the principle of the siphon does not function, and the cleaning liquid remains in the second reservoir unit 64. That is, there is a concern that the liquid level 78 of the second reservoir unit 64 after the emergency stop is located at a position higher than the reference liquid level L1.

Control Method when Abnormality is Determined

When the determination unit 61 determines that the amount of air is abnormal, the control unit 59 may perform the discharge operation and the supply operation. The control unit 59 causes the cleaning liquid in second reservoir unit 64 to be discharged by performing the discharge operation. The control unit 59 causes the cleaning liquid stored in the second reservoir unit 64 to be discharged to the first reservoir unit 63 until the liquid level 78 of the cleaning liquid stored in the second reservoir unit 64 reaches the reference liquid level L1. The control unit 59 may perform the supply operation after the liquid level 78 reaches the reference liquid level L1. The control unit 59 causes the cleaning liquid to be delivered from the first reservoir unit 63 to the second reservoir unit 64 again by performing the supply operation.

The control unit 59 may perform the supply operation and a circulation operation before performing the discharge operation. For example, when the power of the liquid ejecting apparatus 11 is turned on after an emergency stop, the second reservoir unit 64 is opened to the atmosphere. The control unit 59 may raise pressure in the second reservoir unit 64 to the upper limit threshold value by performing the supply operation.

When it is determined to be abnormal when the power of the liquid ejecting apparatus 11 is turned on after the emergency stop, when the pressure is accumulated, and when the cleaning liquid is ejected, there is a concern that the return flow path 67 is not filled with the cleaning liquid. The control unit 59 may perform the circulation operation before the cleaning liquid in the second reservoir unit 64 is discharged. The control unit 59 circulates the cleaning liquid stored in the second reservoir unit 64 from the return flow path 67 passing through the supply flow path 65. Specifically, the control unit 59 drives the pump 66 in a state in which the flow path valve 68 is opened and the atmospheric relief valve 69 is closed. The control unit 59 may drive the pump 66 after opening the flow path valve 68. The pump 66 returns the cleaning liquid, pushed out from the return flow path 67 to the supply flow path 65 by the pressure in the second reservoir unit 64, to the second reservoir unit 64. The cleaning liquid circulates through the filter 71. By circulating the cleaning liquid, the air in the return flow path 67 and the supply flow path 65 moves to the second reservoir unit 64, and the return flow path 67 is filled with the cleaning liquid.

The control unit 59 may perform the discharge operation after the circulation operation. The control unit 59 causes the cleaning liquid in the second reservoir unit 64 to be discharged by the discharge operation. That is, the control unit 59 stops the pump 66 and then opens the atmospheric relief valve 69. At this time, the flow path valve 68 is opened. Therefore, when the pump 66 is stopped, the cleaning liquid in the second reservoir unit 64 is pushed out to the return flow path 67 by the pressure in the second reservoir unit 64, and is discharged to the first reservoir unit 63 passing through the supply flow path 65. When the atmospheric relief valve 69 is opened, the cleaning liquid in the second reservoir unit 64 is discharged to the first reservoir unit 63 by the principle of siphon.

When the liquid level 78 is lowered to the reference liquid level L1 and air flows into the return flow path 67, the discharge of the cleaning liquid from the second reservoir unit 64 is stopped. The control unit 59 waits until the liquid level 78 reaches the reference liquid level L1, and then performs the supply operation again.

That is, when the liquid level 78 reaches the reference liquid level L1, the control unit 59 performs the supply operation again to deliver the cleaning liquid from the first reservoir unit 63 to the second reservoir unit 64. The control unit 59 drives the pump 66 in a state in which the flow path valve 68 and the atmospheric relief valve 69 are closed.

When the ejection of the cleaning liquid is instructed during the discharge operation, the control unit 59 may interrupt the discharge operation and execute the supply operation. When at least one of the plurality of cleaning liquid ejecting units 55 receives an instruction to eject the cleaning liquid during which the cleaning liquid is discharged from the second reservoir unit 64, the control unit 59 may interrupt the discharge operation. The control unit 59 may interrupt the discharge of the cleaning liquid from second reservoir unit 64, regardless of whether or not the cleaning liquid in second reservoir unit 64 is discharged to the reference liquid level L1. The control unit 59 may perform the supply operation to deliver the cleaning liquid to the second reservoir unit 64.

Action of First Embodiment

The action of the present embodiment will be described.

The pressure in the second reservoir unit 64 is maintained between the lower limit threshold value and the upper limit threshold value. When ejection of the cleaning liquid is instructed, the control unit 59 opens the individual valve 74 corresponding to the cleaning liquid ejecting unit 55 to which the ejection is instructed. When the cleaning liquid is ejected from the plurality of cleaning liquid ejecting unit 55, the control unit 59 may open the plurality of individual valves 74 collectively or sequentially. After the cleaning liquid is ejected, the control unit 59 closes the individual valve 74.

Effect of First Embodiment

Effects of the present embodiment will be described.

(1-1) When the determination unit 61 determines that the amount of air in the second reservoir unit 64 is abnormal, the control unit 59 discharges the cleaning liquid in the second reservoir unit 64. By delivering the cleaning liquid to the second reservoir unit 64 after the liquid level 78 of the cleaning liquid stored in the second reservoir unit 64 is set to the reference liquid level L1, the amount of air in the second reservoir unit 64 can be adjusted to an appropriate amount.

(1-2) The determination unit 61 determines abnormality in the amount of air in accordance with the amount of change in pressure inside the second reservoir unit 64 during pressure accumulation. When the amount of change in pressure per unit time is large, there is a possibility that the cleaning liquid is not normally discharged at the time of the previous accumulated pressure release. Therefore, by determining that the amount of air is abnormal and refilling the cleaning liquid into the second reservoir unit 64, the amount of air in the second reservoir unit 64 can be adjusted to an appropriate amount.

(1-3) The determination unit 61 determines abnormality in the amount of air in accordance with the amount of change in pressure when the cleaning liquid ejecting unit 55 ejects the cleaning liquid. When the amount of change in pressure per unit time is large when the cleaning liquid ejecting unit 55 ejects the cleaning liquid, there is a possibility that the amount of air in the second reservoir unit 64 is decreased. Therefore, by determining that the amount of air is abnormal and refilling the cleaning liquid into the second reservoir unit 64, the amount of air in the second reservoir unit 64 can be adjusted to an appropriate amount.

(1-4) When an instruction to eject the cleaning liquid is received during which the cleaning liquid is discharged from the second reservoir unit 64, the discharge is interrupted and the cleaning liquid is delivered to the second reservoir unit 64. For this reason, ejection of the cleaning liquid can be performed rapidly compared to a case in which the cleaning liquid is delivered to the second reservoir unit 64 after the cleaning liquid is discharged to the reference liquid level L1.

(1-5) The determination unit 61 determines abnormality in the amount of air in accordance with the amount of change in pressure when the accumulated pressure is released. When the amount of change in pressure per unit time is large during which the accumulated pressure is released, there is a possibility that the amount of air in the second reservoir unit 64 is decreased. Therefore, by determining that the amount of air is abnormal and refilling the cleaning liquid into the second reservoir unit 64, the amount of air in the second reservoir unit 64 can be adjusted to an appropriate amount.

(1-6) The return flow path 67 is coupled to the supply flow path 65 between the filter 71 and the first reservoir unit 63.

Therefore, the cleaning liquid discharged from the second reservoir unit 64 can be discharged to the first reservoir unit 63 without passing through the filter 71.

(1-7) When the determination unit 61 determines that the amount of air in the second reservoir unit 64 is abnormal, the control unit 59 causes the cleaning liquid stored in the second reservoir unit 64 to circulate. Since the cleaning liquid passes through the return flow path 67 and the supply flow path 65, the return flow path 67 can be filled with the cleaning liquid. When the return flow path 67 is filled with the cleaning liquid, the cleaning liquid can be delivered by the principle of siphon, and thus the cleaning liquid in the second reservoir unit 64 can be appropriately discharged.

(1-8) The determination unit 61 determines abnormality in the amount of air in accordance with the amount of change in pressure inside the second reservoir unit 64 during pressure accumulation. When the amount of change in pressure per unit time is large, there is a possibility that the cleaning liquid is not normally discharged at the time of the previous accumulated pressure release. Therefore, by determining that the amount of air is abnormal and circulating the cleaning liquid, the return flow path 67 can be filled with the cleaning liquid.

(1-9) The return flow path 67 is coupled to the supply flow path 65 between the filter 71 and the first reservoir unit 63. The cleaning liquid circulates through the filter 71. Therefore, foreign matters contained in the cleaning liquid can be captured by the filter 71.

(1-10) In the circulation operation, the control unit 59 firstly opens the flow path valve 68. When the flow path valve 68 is opened, the cleaning liquid in the second reservoir unit 64 is pushed out to the supply flow path 65 passing through the return flow path 67 by the pressure accumulated in the second reservoir unit 64. Subsequently, the control unit 59 drives the pump 66. The pump 66 delivers the cleaning liquid pushed out to the supply flow path 65 to the second reservoir unit 64. Therefore, the cleaning liquid can be easily circulated by using the pressure of the second reservoir unit 64.

Second Embodiment

Next, a second embodiment of a cleaning liquid supplying apparatus, a liquid ejecting apparatus, and a method of controlling the cleaning liquid supplying apparatus will be described with reference to the accompanying drawings. The second embodiment is different from the first embodiment in that a communication flow path is provided instead of the supply flow path and the return flow path. Since the second embodiment is substantially the same as the first embodiment in other respects, the same configurations are denoted by the same reference signs, and redundant description thereof will be omitted.

Figure 4:
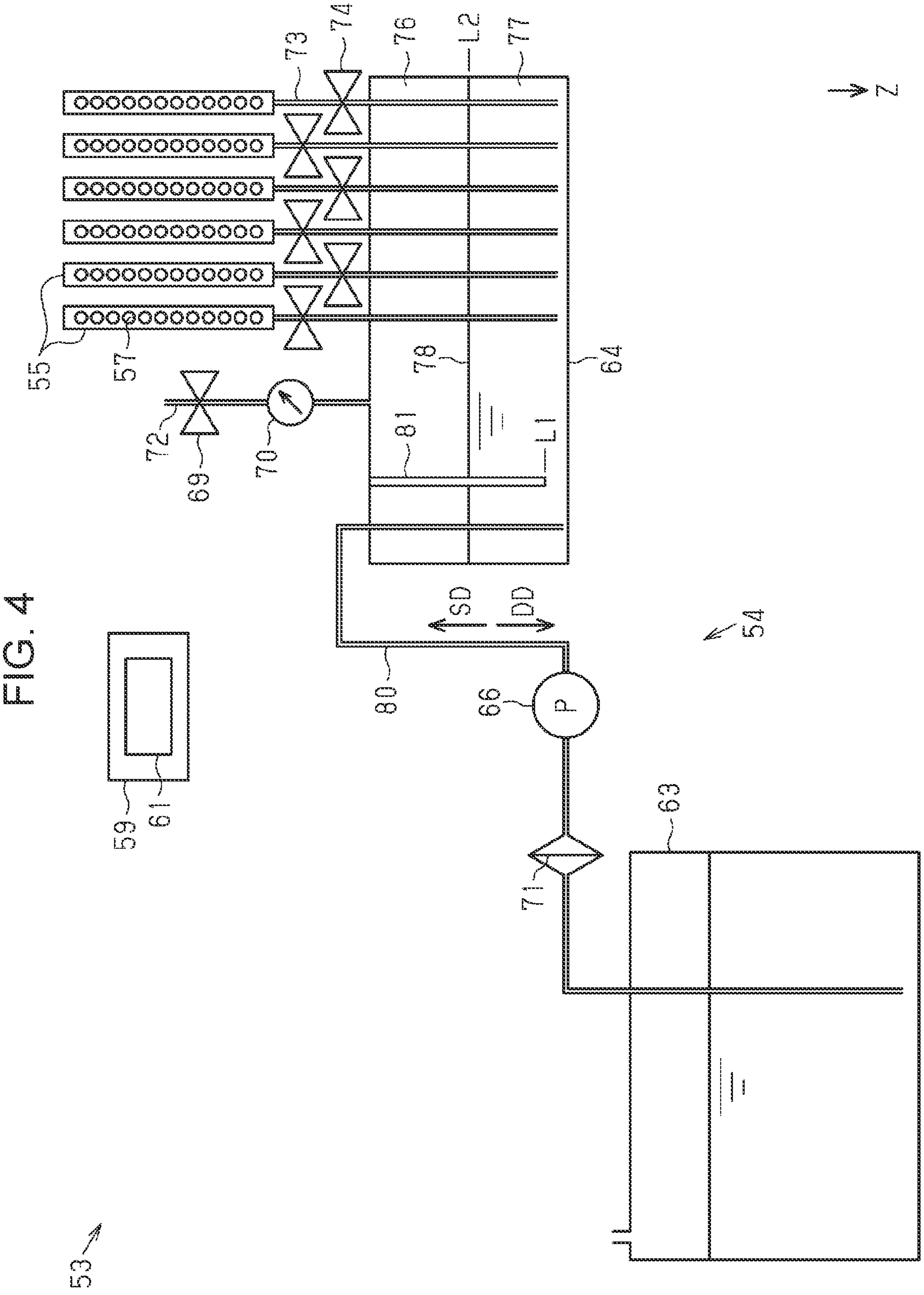
FIG. 4 is a schematic view of a cleaning liquid supplying apparatus according to a second embodiment.

As illustrated in FIG. 4, a cleaning liquid supplying apparatus 53 includes a communication flow path 80. The communication flow path 80 causes a first reservoir unit 63 and a second reservoir unit 64 to communicate with each other. The communication is referred to as coupling of fluids, such as liquids and gases, in a flowable state. That is, the communication flow path 80 couples the first reservoir unit 63 and the second reservoir unit 64 in a state in which the cleaning liquid can flow. The communication flow path 80 may be formed of a tube. The arrangement of the communication flow path 80 may be the same as that of the supply flow path 65 in the first embodiment.

A pump 66 and a filter 71 are provided in the communication flow path 80. The pump 66 may be provided between the filter 71 and the second reservoir unit 64 in the communication flow path 80. The pump 66 of the present embodiment is a reversible pump. The pump 66 can perform normal rotation and reverse rotation. The pump 66 can deliver a liquid from the first reservoir unit 63 to the second reservoir unit 64 by performing normal rotation. The pump 66 can deliver a liquid from the second reservoir unit 64 to the first reservoir unit 63 by performing reverse rotation.

The cleaning liquid supplying apparatus 53 may include a liquid level detection unit 81. The liquid level detection unit 81 detects the height of a liquid level 78 of the cleaning liquid stored in the second reservoir unit 64. The liquid level detection unit 81 may be configured by, for example, an electrode. The liquid level detection unit 81 may detect that the liquid level 78 is lowered to a reference liquid level L1 by detecting resistance which changes between when the cleaning liquid comes into contact with the electrode and when the cleaning liquid does not come into contact with the electrode.

Action of Second Embodiment

The action of the present embodiment will be described.

A control unit 59 controls the pump 66 to control pressure accumulation and accumulated pressure release in the second reservoir unit 64. When a determination unit 61 determines that an amount of air is abnormal, the control unit 59 performs the discharge operation to discharge the cleaning liquid stored in the second reservoir unit 64 to the first reservoir unit 63. The control unit 59 opens an atmospheric relief valve 69 and drives the pump 66 in the reverse rotation. As the cleaning liquid is discharged from the second reservoir unit 64, air flows into the second reservoir unit 64 from an atmospheric relief path 72.

The control unit 59 causes the cleaning liquid to be discharged until the liquid level 78 of the second reservoir unit 64 reaches the reference liquid level L1. When the liquid level detection unit 81 detects that the liquid level 78 reached the reference liquid level L1, the control unit 59 closes the atmospheric relief valve 69 and drives the pump 66 in the normal rotation. The control unit 59 discharges the cleaning liquid stored in the second reservoir unit 64 to the first reservoir unit 63 and then delivers the cleaning liquid from the first reservoir unit 63 to the second reservoir unit 64 again.

When the cleaning liquid is supplied, the pressure inside the second reservoir unit 64 rises. When a pressure detection unit 70 detects that the pressure in the second reservoir unit 64 reached the upper limit threshold value, the control unit 59 stops the driving of the pump 66.

Effect of Second Embodiment

Effects of the present embodiment will be described.

(2-1) When the determination unit 61 determines that the amount of air in the second reservoir unit 64 is abnormal, the control unit 59 discharges the cleaning liquid in the second reservoir unit 64. By delivering the cleaning liquid to the second reservoir unit 64 after the liquid level 78 of the cleaning liquid stored in the second reservoir unit 64 is set to the reference liquid level L1, the amount of air in the second reservoir unit 64 can be adjusted to an appropriate amount.

Third Embodiment

Next, a third embodiment of a cleaning liquid supplying apparatus, a liquid ejecting apparatus, and a method of controlling the cleaning liquid supplying apparatus will be described with reference to the accompanying drawings. The number of pumps in the third embodiment is different from that in the first embodiment. Since the third embodiment is substantially the same as the first embodiment in other respects, the same configurations are denoted by the same reference signs, and redundant description thereof will be omitted.

Figure 5:
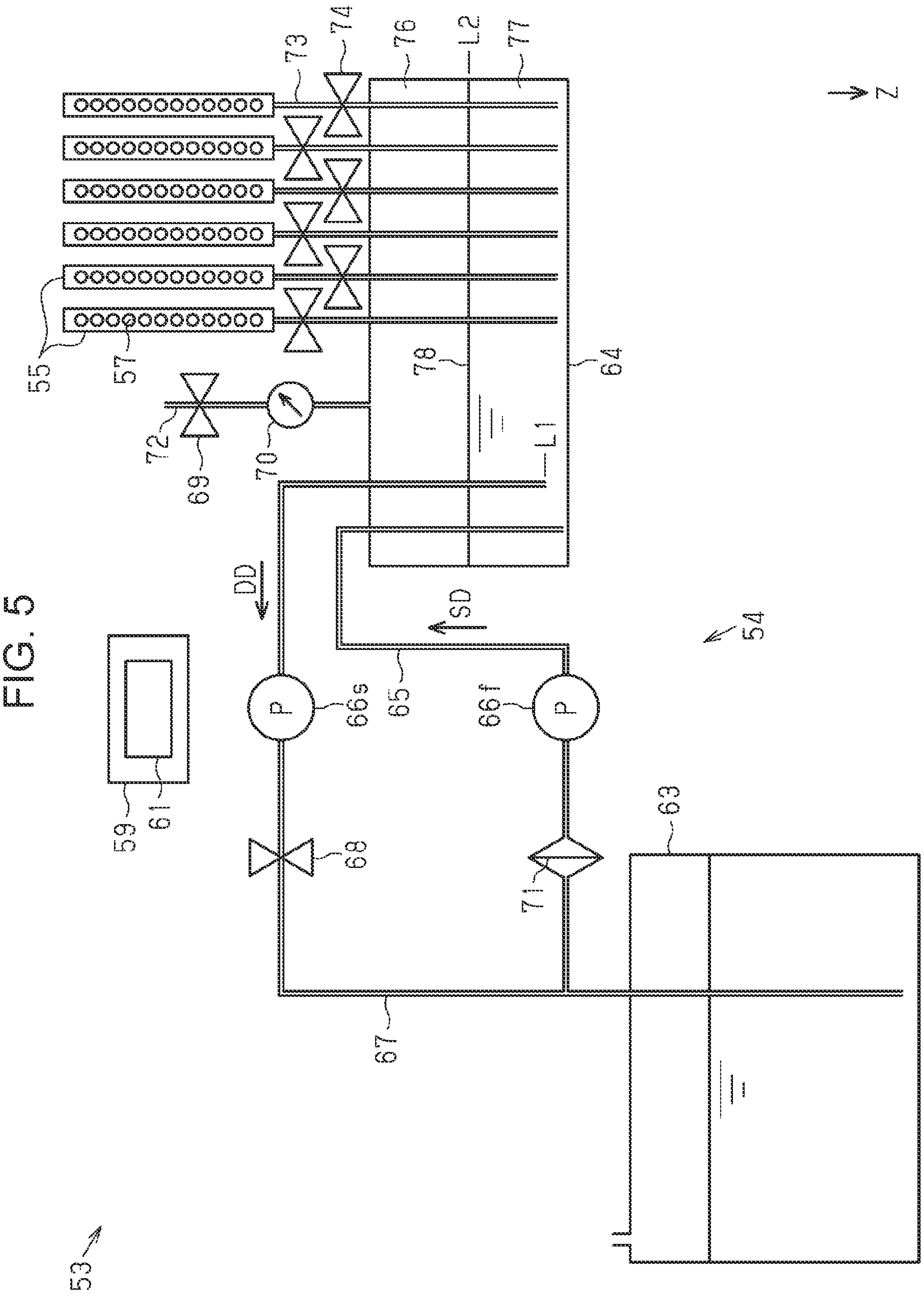
FIG. 5 is a schematic view of a cleaning liquid supplying apparatus according to a third embodiment.

As illustrated in FIG. 5, a cleaning liquid supplying apparatus 53 includes a first pump **66*f* and a second pump 66*s***.

The first pump **66*f* is provided in a supply flow path 65. The first pump 66*f* delivers a fluid in the supply flow path 65 in a supply direction SD. The first pump 66*f* delivers the cleaning liquid from a first reservoir unit 63 to a second reservoir unit 64**.

The second pump **66*s* is provided in a return flow path 67. The second pump 66*s* delivers a fluid in the return flow path 67 in a discharge direction DD. The second pump 66*s* delivers the cleaning liquid from the second reservoir unit 64 to the first reservoir unit 63**.

Action of Third Embodiment

The action of the present embodiment will be described.

A control unit 59 controls the first pump **66*f*, the second pump 66*s*, a flow path valve 68, and an atmospheric relief valve 69 and controls pressure accumulation and accumulated pressure release in the second reservoir unit 64**.

When a determination unit 61 determines that an amount of air is abnormal, the control unit 59 performs the discharge operation to discharge the cleaning liquid stored in the second reservoir unit 64 to the first reservoir unit 63. The control unit 59 opens the flow path valve 68 and the atmospheric relief valve 69 and drives the second pump **66*s*. As the cleaning liquid is discharged from the second reservoir unit 64, air flows into the second reservoir unit 64 from an atmospheric relief path 72**.

The control unit 59 causes the cleaning liquid to be discharged until a liquid level 78 of the second reservoir unit 64 reaches a reference liquid level L1. When the liquid level 78 is lowered to the reference liquid level L1 and air flows into the return flow path 67, the lowering of the liquid level 78 is stopped. When a time required for the liquid level 78 to be lowered to the reference liquid level L1 elapses, the control unit 59 stops the driving of the second pump **66*s* and closes the flow path valve 68**.

Subsequently, the control unit 59 performs the supply operation. The control unit 59 closes the atmospheric relief valve 69 and drives the first pump **66*f*. That is, the control unit 59 discharges the cleaning liquid stored in the second reservoir unit 64 to the first reservoir unit 63, and then delivers the cleaning liquid from the first reservoir unit 63 to the second reservoir unit 64** again.

When the cleaning liquid is supplied, the pressure inside the second reservoir unit 64 rises. When a pressure detection unit 70 detects that the pressure inside the second reservoir unit 64 reached the upper limit threshold value, the control unit 59 stops the driving of the first pump **66*f***.

Effect of Third Embodiment

Effects of the present embodiment will be described.

(3-1) The second pump **66*s* is provided in the return flow path 67. By driving the second pump 66*s*, the cleaning liquid stored in the second reservoir unit 64** can be discharged.

Fourth Embodiment

Next, a fourth embodiment of a cleaning liquid supplying apparatus, a liquid ejecting apparatus, and a method of controlling the cleaning liquid supplying apparatus will be described with reference to the accompanying drawings. The fourth embodiment is different from the third embodiment in the arrangement of a second pump. Since the fourth embodiment is substantially the same as the third embodiment in other respects, the same configurations are denoted by the same reference signs, and redundant description thereof will be omitted.

Figure 6:
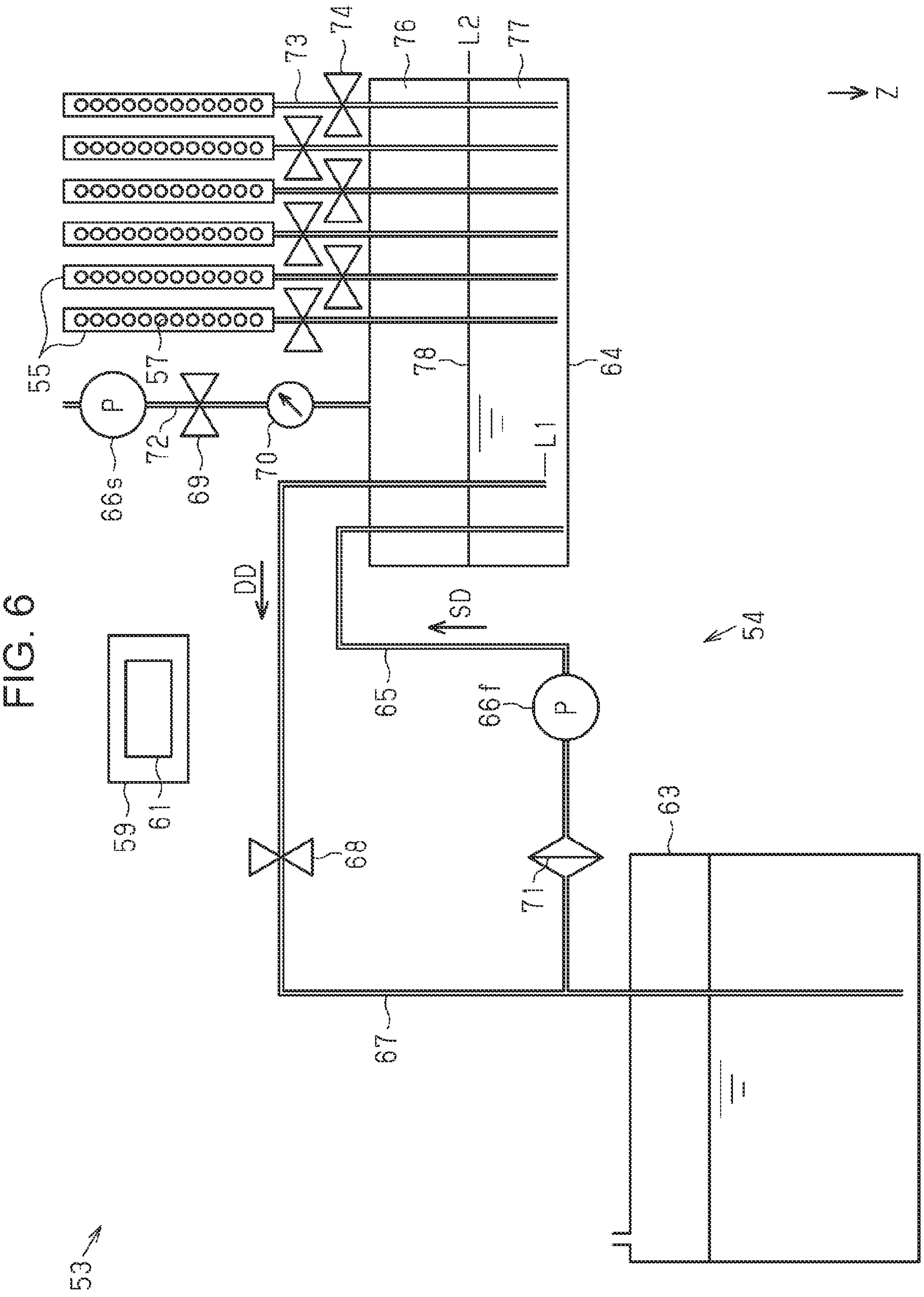
FIG. 6 is a schematic view of a cleaning liquid supplying apparatus according to a fourth embodiment.

As illustrated in FIG. 6, a second pump **66*s* is provided in an atmospheric relief path 72. The second pump 66*s* delivers air into a second reservoir unit 64**.

Action of Fourth Embodiment

The action of the present embodiment will be described.

When a determination unit 61 determines that an amount of air is abnormal, a control unit 59 performs the discharge operation to discharge the cleaning liquid stored in the second reservoir unit 64 to a first reservoir unit 63. The control unit 59 opens a flow path valve 68 and an atmospheric relief valve 69 and drives the second pump **66*s*. The second pump 66*s* pushes out the cleaning liquid in the second reservoir unit 64 to a return flow path 67 by delivering air into the second reservoir unit 64**.

The control unit 59 causes the cleaning liquid to be discharged until a liquid level 78 of the second reservoir unit 64 reaches a reference liquid level L1. When the liquid level 78 is lowered to the reference liquid level L1 and air flows into the return flow path 67, the lowering of the liquid level 78 is stopped. When the time required for the liquid level 78 to be lowered to the reference liquid level L1 elapses, the control unit 59 stops the driving of the second pump **66*s* and closes the flow path valve 68. Subsequently, the control unit 59** performs the supply operation as in the third embodiment.

Effect of Fourth Embodiment

Effects of the present embodiment will be described.

(4-1) The second pump **66*s* is provided in the atmospheric relief path 72. The second pump 66*s* raises the pressure of the second reservoir unit 64 by delivering air into the second reservoir unit 64. Therefore, the speed at which the cleaning liquid is discharged from the second reservoir unit 64** can be increased.

Fifth Embodiment

Next, a fifth embodiment of a cleaning liquid supplying apparatus, a liquid ejecting apparatus, and a method of controlling the cleaning liquid supplying apparatus will be described with reference to the accompanying drawings. The fifth embodiment is different from the first embodiment in that a liquid level detection unit is provided. Since the fifth embodiment is substantially the same as the first embodiment in other respects, the same configurations are denoted by the same reference signs, and redundant description thereof will be omitted.

Figure 7:
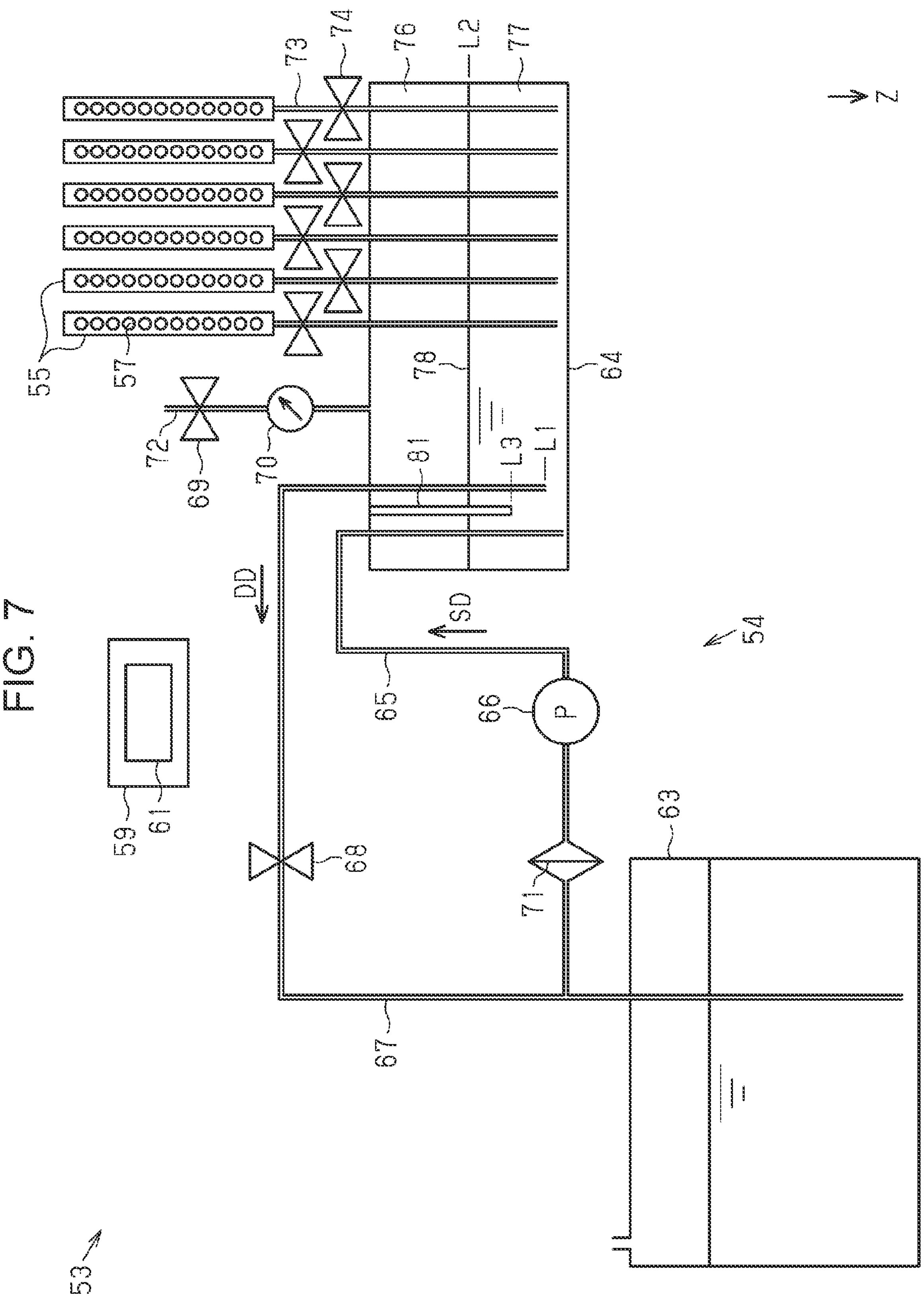
FIG. 7 is a schematic view of a cleaning liquid supplying apparatus according to a fifth embodiment.

As illustrated in FIG. 7, a cleaning liquid supplying apparatus 53 includes a liquid level detection unit 81. The liquid level detection unit 81 may be configured by, for example, an electrode. The liquid level detection unit 81 may detect whether or not a liquid level 78 is at a position higher than a liquid level threshold value L3 by detecting resistance that changes between when the cleaning liquid comes into contact with the electrode and when the cleaning liquid does not come into contact with the electrode.

Action of Fifth Embodiment

The action of the present embodiment will be described.

A control unit 59 may detect the position of the liquid level 78, for example, when the power of a liquid ejecting apparatus 11 is turned on. A determination unit 61 may determine that an amount of air is abnormal when the height of the liquid level 78 is higher than the liquid level threshold value L3. The control unit 59 may perform the circulation operation when it is determined that the height of the liquid level 78 detected by the liquid level detection unit 81 is higher than the liquid level threshold value L3.

Effect of Fifth Embodiment

Effects of the present embodiment will be described.

(5-1) When it is determined that the height of the liquid level 78 of the cleaning liquid stored in a second reservoir unit 64 is higher than the liquid level threshold value L3, the control unit 59 circulates the cleaning liquid stored in the second reservoir unit 64. Since the cleaning liquid passes through a return flow path 67 and a supply flow path 65, the return flow path 67 can be filled with the cleaning liquid. When the return flow path 67 is filled with the cleaning liquid, the cleaning liquid can be delivered by the principle of siphon, and thus the cleaning liquid in the second reservoir unit 64 can be appropriately discharged.

Modification

The present embodiment can be implemented with the following modifications. The present embodiment and the following modifications can be implemented in combination with each other as long as there is no technical contradiction.

The cleaning liquid supplying apparatus 53 may include one or more of liquid level detection units 81.

The liquid level detection unit 81 may include a prism, an irradiation unit, and a light receiving unit. The prism is provided in the second reservoir unit 64. The irradiation unit irradiates the prism with light. The light receiving unit receives the light refracted by the prism. During which the prism is in contact with the cleaning liquid, light is diffused in the cleaning liquid. When the liquid level 78 is positioned lower than the prism and the prism is exposed from the cleaning liquid, the light refracted by the prism reaches the light receiving unit. The liquid level detection unit 81 may detect the height of the liquid level 78 from a change in an amount of light received by the light receiving unit.

The liquid level detection unit 81 may be a float sensor that is provided in the second reservoir unit 64 and detects a position of a float floating on the cleaning liquid.

The liquid level detection unit 81 may be an image sensor that detects an image. The liquid level detection unit 81 may detect the height of the liquid level 78 by analyzing the image detected by the image sensor.

The liquid level detection unit 81 may be a photoelectric sensor including a light emitting unit that emits light and a light receiving unit that receives light. The light emitting unit and the light receiving unit may be provided with the second reservoir unit 64 interposed therebetween. The light receiving unit may receive light transmitted through the second reservoir unit 64. For example, when the liquid level 78 is above the photoelectric sensor, the light is blocked by the cleaning liquid existing between the light emitting unit and the light receiving unit. The liquid level detection unit 81 may detect the height of the liquid level 78 from a change in an amount of light received by the light receiving unit.

In the second embodiment, the cleaning liquid supplying apparatus 53 may have a configuration without being provided with the liquid level detection unit 81. In the second embodiment, the height of an end of the communication flow path 80 provided in the second reservoir unit 64 may be set as the reference liquid level L1. The control unit 59 may cause the height of the liquid level 78 to be the reference liquid level L1 by discharging the cleaning liquid from the second reservoir unit 64 by driving the pump 66 in the reverse rotation and discharging the cleaning liquid until air flows into the communication flow path 80.

The cleaning liquid supplying apparatus 53 may include a partition wall that partitions the inside of the second reservoir unit 64. The partition wall partitions the liquid reservoir 77 and the air reservoir 76. The partition wall may be a movable piston or a flexible film. The liquid level detection unit 81 may detect the position or swelling of the partition wall.

The cleaning liquid supplying apparatus 53 may have a configuration without being provided with the atmospheric relief path 72. The atmospheric relief valve 69 may be directly provided in the second reservoir unit 64. The pressure detection unit 70 may be directly provided in the second reservoir unit 64.

The downstream end of the return flow path 67 may be coupled to the first reservoir unit 63. The cleaning liquid supplying apparatus 53 may circulate the cleaning liquid in the first reservoir unit 63, the supply flow path 65, the second reservoir unit 64, and the return flow path 67.

The downstream end of the return flow path 67 may be coupled to the supply flow path 65 between the filter 71 and the pump 66. The downstream end of the return flow path 67 may be coupled to the supply flow path 65 between the filter 71 and the first pump **66*f***.

The filter 71 may be provided between the pump 66 or the first pump **66*f* and the second reservoir unit 64 in the supply flow path 65. The filter 71 may be provided between the pump 66 and the second reservoir unit 64 in the communication flow path 80. The cleaning liquid supplying apparatus 53 may have a configuration without being provided with the filter 71. The return flow path 67 may be coupled between the pump 66 and the first reservoir unit 63 in the supply flow path 65**.

When the cleaning liquid ejecting unit 55 receives an instruction to eject the cleaning liquid during the discharge operation, the control unit 59 may discharge the cleaning liquid to the reference liquid level L1 and then deliver the cleaning liquid to the second reservoir unit 64.

In the circulation operation, the control unit 59 may circulate the cleaning liquid by driving the pump 66 and then opening the flow path valve 68.

In the second to fourth embodiments, the first reservoir unit 63 may be provided at the same height as the second reservoir unit 64. The first reservoir unit 63 may be provided at a position higher than the second reservoir unit 64.

The liquid ejecting apparatus 11 may be a liquid ejecting apparatus that injects or ejects liquid other than ink. The state of the liquid that is ejected from the liquid ejecting apparatus in a form of a minute amount of liquid droplets includes a granular shape, a teardrop shape, and a shape with a thread-like tail. Here, the liquid may be a material that can be ejected from the liquid ejecting apparatus. For example, the liquid may be in a state in which a substance is in a liquid phase, and includes a fluid body such as a liquid body having high or low viscosity, sol, gel water, other inorganic solvents, an organic solvent, a solution, a liquid resin, a liquid metal, and a metal melt. The liquid includes not only a liquid as one state of a substance but also a liquid in which particles of a functional material, made of a solid material such as a pigment or a metal particle, are dissolved, dispersed, or mixed in a solvent. Typical examples of the liquid include ink, liquid crystal, and the like as described in the above embodiment. Here, the ink includes various liquid compositions such as commonly used water-based ink, oil-based ink, gel ink, and hot-melt ink. As a specific example of the liquid ejecting apparatus, for example, there is an apparatus that ejects a liquid containing a material such as an electrode material or a color material used for manufacturing a liquid crystal display, an electroluminescence display, a surface emitting display, a color filter, or the like in a dispersed or dissolved form. The liquid ejecting apparatus may be an apparatus that ejects a bio-organic substance used for manufacturing a biochip, an apparatus that is used as a precision pipette and ejects a liquid serving as a sample, a textile printing apparatus, a micro dispenser, or the like. The liquid ejecting apparatus may be an apparatus that ejects a lubricating oil to a precision machine such as a watch or a camera in a pinpoint manner, or an apparatus that ejects a transparent resin liquid such as an ultraviolet curable resin onto a substrate to form a micro hemispherical lens, an optical lens, or the like used for an optical communication element or the like. The liquid ejecting apparatus may be an apparatus that ejects an etchant such as an acid or an alkali for etching a substrate or the like.

Definition

As used in the present embodiment, the phrase "at least one" means "one or more" of desired alternatives. As an example, the phrase "at least one" as used in the present embodiment means "only one option" or "both of two options" when the number of options is two. As another example, the phrase "at least one" as used in the present embodiment means "only one option" or "any combination of two or more options" when the number of options is three or more.

Supplementary Note

Hereinafter, technical ideas grasped from the above-described embodiments and modifications, and actions and effects thereof will be described.

(A) A cleaning liquid supplying apparatus includes a first reservoir unit configured to store a cleaning liquid, a second reservoir unit of a pressure accumulation type configured to form an air reservoir inside when the second reservoir unit stores the cleaning liquid, a supply flow path through which the cleaning liquid stored in the first reservoir unit is delivered to the second reservoir unit, a pump provided in the supply flow path, a return flow path through which the cleaning liquid stored in the second reservoir unit is discharged to the first reservoir unit, a flow path valve provided in the return flow path, an atmospheric relief valve configured to open the second reservoir unit to the atmosphere, a control unit configured to control the pump, the flow path valve, and the atmospheric relief valve and control pressure accumulation and accumulated pressure release in the second reservoir unit, a plurality of cleaning liquid ejecting units configured to eject the cleaning liquid stored in the second reservoir unit, a pressure detection unit configured to detect pressure inside the second reservoir unit, and a determination unit configured to determine abnormality in an amount of air in the second reservoir unit, based on an amount of change in the pressure per unit time. The first reservoir unit is provided at a position lower than a position of the second reservoir unit in the gravity direction, when the determination unit determines that the amount of air is abnormal, after the cleaning liquid stored in the second reservoir unit is discharged to the first reservoir unit until a liquid level of the cleaning liquid stored in the second reservoir unit reaches a reference liquid level, the control unit causes the cleaning liquid to be delivered from the first reservoir unit to the second reservoir unit again.

According to this configuration, when the determination unit determines that the amount of air in the second reservoir unit is abnormal, the control unit discharges the cleaning liquid in the second reservoir unit. By delivering the cleaning liquid to the second reservoir unit after the liquid level of the cleaning liquid stored in the second reservoir unit is set to the reference liquid level, the amount of air in the second reservoir unit can be adjusted to an appropriate amount.

(B) In the cleaning liquid supplying apparatus described in (A), the determination unit may determine that the amount of air is abnormal when the amount of change in the pressure per unit time is large during the pressure accumulation.

According to this configuration, the determination unit determines abnormality in the amount of air in accordance with the amount of change in pressure inside the second reservoir unit during pressure accumulation. When the amount of change in pressure per unit time is large, there is a possibility that the cleaning liquid is not normally discharged at the time of the previous accumulated pressure release. Therefore, by determining that the amount of air is abnormal and refilling the cleaning liquid into the second reservoir unit, the amount of air in the second reservoir unit can be adjusted to an appropriate amount.

(C) In the cleaning liquid supplying apparatus described in (A) or (B), the determination unit may determine that the amount of air is abnormal when the amount of change in the pressure per unit time is large, in a case in which at least one of the plurality of cleaning liquid ejecting units ejects the cleaning liquid.

According to this configuration, the determination unit determines abnormality in the amount of air in accordance with the amount of change in the pressure when the cleaning liquid ejecting unit ejects the cleaning liquid. When the amount of change in the pressure per unit time is large and the cleaning liquid ejecting unit ejects the cleaning liquid, there is a possibility that the amount of air in the second reservoir unit is decreased. Therefore, by determining that the amount of air is abnormal and refilling the cleaning liquid into the second reservoir unit, the amount of air in the second reservoir unit can be adjusted to an appropriate amount.

(D) In the cleaning liquid supplying apparatus described in (C), when at least one of the plurality of cleaning liquid ejecting units receives an instruction to eject the cleaning liquid while the cleaning liquid is discharged from the second reservoir unit, the control unit may interrupt discharge of the cleaning liquid from the second reservoir unit and cause the cleaning liquid to be delivered to the second reservoir unit, regardless of whether or not the cleaning liquid in the second reservoir unit is discharged to the reference liquid level.

According to this configuration, when an instruction to eject the cleaning liquid is received during which the cleaning liquid is discharged from the second reservoir unit, the discharge is interrupted, and the cleaning liquid is delivered to the second reservoir unit. Therefore, compared to a case when delivering the cleaning liquid to the second reservoir unit after the cleaning liquid is discharged to the reference liquid level, ejection of the cleaning liquid can be performed rapidly.

(E) In the cleaning liquid supplying apparatus described in (A) to (C), the determination unit may determine that the amount of air is abnormal when the amount of change in the pressure per unit time is large in the accumulated pressure release.

According to this configuration, the determination unit determines abnormality in the amount of air in accordance with the amount of change in the pressure when the accumulated pressure is released. When the amount of change in the pressure per unit time is large in accumulated pressure release, there is a possibility that the amount of air in the second reservoir unit is decreased. Therefore, by determining that the amount of air is abnormal and refilling the cleaning liquid into the second reservoir unit, the amount of air in the second reservoir unit can be adjusted to an appropriate amount.

(F) In the cleaning liquid supplying apparatus described in (E), when at least one of the plurality of cleaning liquid ejecting units receives an instruction to eject the cleaning liquid while the cleaning liquid is discharged from the second reservoir unit, the control unit may interrupt discharge of the cleaning liquid from the second reservoir unit and cause the cleaning liquid to be delivered to the second reservoir unit, regardless of whether or not the cleaning liquid in the second reservoir unit is discharged to the reference liquid level. According to this configuration, the same effects as those of the above-described cleaning liquid supplying apparatus can be achieved.

(G) The cleaning liquid supplying apparatus described in (A) to (F), the supply flow path may be provided with a filter between the pump and the first reservoir unit, and the return flow path may be coupled to the supply flow path between the filter and the first reservoir unit.

According to this configuration, the return flow path is coupled to the supply flow path between the filter and the first reservoir unit. Therefore, the cleaning liquid discharged from the second reservoir unit can be discharged to the first reservoir unit without passing through the filter.

(H) A cleaning liquid supplying apparatus includes a first reservoir unit configured to store a cleaning liquid, a second reservoir unit of a pressure accumulation type configured to form an air reservoir inside when the second reservoir unit stores the cleaning liquid, a communication flow path through which the first reservoir unit and the second reservoir unit communicate, a reversible pump provided in the communication flow path and configured to deliver a liquid from the first reservoir unit to the second reservoir unit and deliver a liquid from the second reservoir unit to the first reservoir unit, an atmospheric relief valve configured to open the second reservoir unit to the atmosphere, a control unit configured to control the reversible pump and control pressure accumulation and accumulated pressure release in the second reservoir unit, a plurality of cleaning liquid ejecting units configured to eject the cleaning liquid stored in the second reservoir unit, a pressure detection unit configured to detect pressure inside the second reservoir unit, and a determination unit configured to determine abnormality in an amount of air in the second reservoir unit, based on an amount of change in the pressure per unit time. When the determination unit determines that the amount of air is abnormal, after the cleaning liquid stored in the second reservoir unit is discharged to the first reservoir unit until a liquid level of the cleaning liquid stored in the second reservoir unit reaches a reference liquid level, the control unit causes the cleaning liquid to be delivered from the first reservoir unit to the second reservoir unit again. According to this configuration, the same effects as those of the above-described cleaning liquid supplying apparatus can be achieved.

(I) A cleaning liquid supplying apparatus includes a first reservoir unit configured to store a cleaning liquid, a second reservoir unit of a pressure accumulation type configured to form an air reservoir inside when the second reservoir unit stores the cleaning liquid, a supply flow path through which the cleaning liquid stored in the first reservoir unit is delivered to the second reservoir unit, a first pump provided in the supply flow path, a return flow path through which the cleaning liquid stored in the second reservoir unit is discharged to the first reservoir unit, a second pump, a flow path valve provided in the return flow path, an atmospheric relief valve configured to open the second reservoir unit to the atmosphere, a control unit configured to control the first pump, the second pump, the flow path valve, and the atmospheric relief valve and control pressure accumulation and accumulated pressure release in the second reservoir unit, a plurality of cleaning liquid ejecting units configured to eject the cleaning liquid stored in the second reservoir unit, a pressure detection unit configured to detect pressure inside the second reservoir unit, and a determination unit configured to determine abnormality in an amount of air in the second reservoir unit, based on an amount of change in the pressure per unit time. When the determination unit determines that the amount of air is abnormal, after the cleaning liquid stored in the second reservoir unit is discharged to the first reservoir unit until a liquid level of the cleaning liquid stored in the second reservoir unit reaches a reference liquid level, the control unit causes the cleaning liquid to be delivered from the first reservoir unit to the second reservoir unit again. According to this configuration, the same effects as those of the above-described cleaning liquid supplying apparatus can be achieved.

(J) In the cleaning liquid supplying apparatus described in (I), the second pump may be provided in the return flow path.

According to this configuration, the second pump is provided in the return flow path. By driving the second pump, the cleaning liquid stored in the second reservoir unit can be discharged.

(K) The cleaning liquid supplying apparatus described in (I) may further include an atmospheric relief path provided with the atmospheric relief valve, and the second pump may be provided in the atmospheric relief path.

According to this configuration, the second pump is provided in the atmospheric relief path. The second pump raises the pressure of the second reservoir unit by delivering air into the second reservoir unit. Therefore, the speed at which the cleaning liquid is discharged from the second reservoir unit can be increased.

(L) A liquid ejecting apparatus includes the cleaning liquid supplying apparatus described in (A) to (K), a plurality of liquid droplet ejecting heads each configured to eject a functional liquid and provided correspondingly to the plurality of cleaning liquid ejecting units, and a plurality of wiping apparatuses configured to wipe a nozzle surface of each of the liquid droplet ejecting heads. Each of the cleaning liquid ejecting units sprays a cleaning liquid to each of the liquid droplet ejecting heads. According to this configuration, the same effects as those of the above-described cleaning liquid supplying apparatus can be achieved.

(M) A method of controlling a cleaning liquid supplying apparatus includes a cleaning liquid supplying apparatus including a first reservoir unit storing a cleaning liquid, a second reservoir unit of a pressure accumulation type forming an air reservoir inside when the second reservoir unit stores the cleaning liquid, a supply flow path through which the cleaning liquid stored in the first reservoir unit is delivered to the second reservoir unit, a pump provided in the supply flow path, a return flow path through which the cleaning liquid stored in the second reservoir unit is discharged to the first reservoir unit, a flow path valve provided in the return flow path, an atmospheric relief valve opening the second reservoir unit to the atmosphere, and a plurality of cleaning liquid ejecting units ejecting the cleaning liquid stored in the second reservoir unit, the first reservoir unit being provided at a position lower than a position of the second reservoir unit in the gravity direction. The method of controlling the cleaning liquid supplying apparatus includes detecting pressure inside the second reservoir unit, determining abnormality in an amount of air in the second reservoir unit, based on an amount of change in the pressure per unit time, and when the amount of air is determined to be abnormal, after the cleaning liquid stored in the second reservoir unit is discharged to the first reservoir unit until a liquid level of the cleaning liquid stored in the second reservoir unit reaches a reference liquid level, delivering the cleaning liquid from the first reservoir unit to the second reservoir unit again. According to this method, the same effects as those of the above-described cleaning liquid supplying apparatus can be achieved.

(N) A cleaning liquid supplying apparatus includes a first reservoir unit configured to store a cleaning liquid, a second reservoir unit of a pressure accumulation type configured to form an air reservoir inside when the second reservoir unit stores the cleaning liquid, a supply flow path through which the cleaning liquid stored in the first reservoir unit is delivered to the second reservoir unit, a pump provided in the supply flow path, a return flow path through which the cleaning liquid stored in the second reservoir unit is discharged to the first reservoir unit, a flow path valve provided in the return flow path, an atmospheric relief valve configured to open the second reservoir unit to the atmosphere, a control unit configured to control the pump, the flow path valve, and the atmospheric relief valve and control pressure accumulation and accumulated pressure release in the second reservoir unit, a plurality of cleaning liquid ejecting units configured to eject the cleaning liquid stored in the second reservoir unit, a pressure detection unit configured to detect pressure inside the second reservoir unit, and a determination unit configured to determine abnormality in an amount of air in the second reservoir unit, based on an amount of change in the pressure per unit time, in which the first reservoir unit being provided at a position lower than the second reservoir unit in the gravity direction, when the determination unit determines that the amount of air is abnormal, the control unit causes the cleaning liquid stored in the second reservoir unit to circulate from the return flow path passing through the supply flow path.

According to this configuration, when the determination unit determines that the amount of air in the second reservoir unit is abnormal, the control unit causes the cleaning liquid stored in the second reservoir unit to circulate. Since the cleaning liquid passes through the return flow path and the supply flow path, the return flow path can be filled with the cleaning liquid. When the return flow path is filled with the cleaning liquid, the cleaning liquid can be delivered by the principle of siphon, and thus the liquid in the second reservoir unit can be appropriately discharged.

(O) In the cleaning liquid supplying apparatus described in (N), the determination unit determines that an amount of air is abnormal when an amount of change in the pressure per unit time is large during the pressure accumulation.

According to this configuration, the determination unit determines abnormality in the amount of air in accordance with the amount of change in pressure inside the second reservoir unit during pressure accumulation. When the amount of change in pressure per unit time is large, there is a possibility that the cleaning liquid is not normally discharged at the time of the previous accumulated pressure release. Therefore, by determining that the amount of air is abnormal and circulating the cleaning liquid, the return flow path can be filled with the cleaning liquid.

(P) The cleaning liquid supplying apparatus described in (N) or (O) may include a filter provided between the pump and the first reservoir unit in the supply flow path, and the return flow path may be coupled to the supply flow path between the filter and the first reservoir unit.

According to this configuration, the return flow path is coupled to the supply flow path between the filter and the first reservoir unit. The cleaning liquid is circulated through the filter. Therefore, foreign matters contained in the cleaning liquid can be captured by the filter.

(Q) In the cleaning liquid supplying apparatus described in (N) to (P), the control unit may drive the pump after opening the flow path valve to circulate the cleaning liquid stored in the second reservoir unit from the return flow path passing through the supply flow path.

According to this configuration, the control unit firstly opens the flow path valve. When the flow path valve is opened, the cleaning liquid in the second reservoir unit is pushed out to the supply flow path passing through the return flow path by the pressure accumulated in the second reservoir unit. Subsequently, the control unit drives the pump. The pump delivers the cleaning liquid pushed out to the supply flow path to the second reservoir unit. Therefore, the cleaning liquid can be circulated easily using the pressure of the second reservoir unit.

(R) A cleaning liquid supplying apparatus includes a first reservoir unit configured to store a cleaning liquid, a second reservoir unit of a pressure accumulation type configured to form an air reservoir inside when the second reservoir unit stores the cleaning liquid, a supply flow path through which the cleaning liquid stored in the first reservoir unit is delivered to the second reservoir unit, a pump provided in the supply flow path, a return flow path through which the cleaning liquid stored in the second reservoir unit is discharged to the first reservoir unit, a flow path valve provided in the return flow path, an atmospheric relief valve configured to open the second reservoir unit to the atmosphere, a control unit configured to control the pump, the flow path valve, and the atmospheric relief valve and control pressure accumulation and accumulated pressure release in the second reservoir unit, a plurality of cleaning liquid ejecting units configured to eject the cleaning liquid stored in the second reservoir unit, a pressure detection unit configured to detect pressure inside the second reservoir unit, and a determination unit configured to determine abnormality in an amount of air in the second reservoir unit, based on an amount of change in the pressure per unit time, and a liquid level detection unit configured to detect a height of a liquid level of the cleaning liquid stored in the second reservoir unit, in which the first reservoir unit being provided at a position lower than a position of the second reservoir unit in the gravity direction, when a liquid level detected by the liquid level detection unit is determined to be higher than a liquid level threshold value, the control unit causes the cleaning liquid stored in the second reservoir unit to circulate from the return flow path passing through the supply flow path.

According to this configuration, when the height of the liquid level of the cleaning liquid stored in the second reservoir unit is determined to be higher than the liquid level threshold value, the control unit causes the cleaning liquid stored in the second reservoir unit to circulate. Since the cleaning liquid passes through the return flow path and the supply flow path, the return flow path can be filled with the cleaning liquid. When the return flow path is filled with the cleaning liquid, the cleaning liquid can be delivered by the principle of siphon, and thus the liquid in the second reservoir unit can be appropriately discharged.

(S) A liquid ejecting apparatus includes the cleaning liquid supplying apparatus described in (N) to (R), a plurality of liquid droplet ejecting heads each configured to eject a functional liquid and provided correspondingly to the plurality of cleaning liquid ejecting units, and a plurality of wiping apparatuses configured to wipe a nozzle surface of each of the liquid droplet ejecting heads, and each of the cleaning liquid ejecting units sprays a cleaning liquid to each of the liquid droplet ejecting heads. According to this configuration, the same effects as those of the above-described cleaning liquid supplying apparatus can be achieved.

(T) A method of controlling a cleaning liquid supplying apparatus including a cleaning liquid supplying apparatus including a first reservoir unit storing a cleaning liquid, a second reservoir unit of a pressure accumulation type forming an air reservoir inside when the second reservoir unit stores the cleaning liquid, a supply flow path delivering the cleaning liquid stored in the first reservoir unit to the second reservoir unit, a pump being provided in the supply flow path, a return flow path through which the cleaning liquid stored in the second reservoir unit is discharged to the first reservoir unit, a flow path valve being provided in the return flow path, an atmospheric relief valve opening the second reservoir unit to the atmosphere, and a plurality of cleaning liquid ejecting units ejecting the cleaning liquid stored in the second reservoir unit, the first reservoir unit being provided at a position lower than a position of the second reservoir unit in the gravity direction, the method of controlling the cleaning liquid supplying apparatus includes detecting pressure inside the second reservoir unit, determining abnormality in an amount of air in the second reservoir unit, based on an amount of change in the pressure per unit time, and when the amount of air is determined to be abnormal, circulating the cleaning liquid stored in the second reservoir unit from the return flow path passing through the supply flow path. According to this method, the same effects as those of the above-described cleaning liquid supplying apparatus can be achieved.

What is claimed is:

1. A cleaning liquid supplying apparatus, comprising:

a first reservoir unit configured to store a cleaning liquid;

a second reservoir unit of a pressure accumulation type configured to form an air reservoir inside when the second reservoir unit stores the cleaning liquid;

a supply flow path through which the cleaning liquid stored in the first reservoir unit is delivered to the second reservoir unit;

a pump provided in the supply flow path;

a return flow path through which the cleaning liquid stored in the second reservoir unit is discharged to the first reservoir unit;

a flow path valve provided in the return flow path;

an atmospheric relief valve configured to open the second reservoir unit to an atmosphere;

a control unit configured to control the pump, the flow path valve, and the atmospheric relief valve and control pressure accumulation and accumulated pressure release in the second reservoir unit;

a plurality of cleaning liquid ejecting units configured to eject the cleaning liquid stored in the second reservoir unit;

a pressure detection unit configured to detect pressure inside the second reservoir unit; and a determination unit configured to determine abnormality in an amount of air in the second reservoir unit, based on an amount of change in the pressure per unit time, wherein the first reservoir unit is provided at a position lower than a position of the second reservoir unit in a gravity direction, and when the determination unit determines that the amount of air is abnormal, after the cleaning liquid stored in the second reservoir unit is discharged to the first reservoir unit until a liquid level of the cleaning liquid stored in the second reservoir unit reaches a reference liquid level, the control unit causes the cleaning liquid to be delivered from the first reservoir unit to the second reservoir unit again.

2. The cleaning liquid supplying apparatus according to claim 1, wherein the determination unit determines that the amount of air is abnormal when the amount of change in the pressure per unit time is greater than a predetermined pressure rising threshold value during the pressure accumulation.

3. The cleaning liquid supplying apparatus according to claim 1, wherein the determination unit determines that the amount of air is abnormal when the amount of change in the pressure per unit time is greater than a predetermined during-ejection threshold value, in a case in which at least one of the plurality of cleaning liquid ejecting units ejects the cleaning liquid.

4. The cleaning liquid supplying apparatus according to claim 3, wherein when at least one of the plurality of cleaning liquid ejecting units receives an instruction to eject the cleaning liquid while the cleaning liquid is discharged from the second reservoir unit, the control unit interrupts discharge of the cleaning liquid from the second reservoir unit and causes the cleaning liquid to be delivered to the second reservoir unit, regardless of whether or not the cleaning liquid in the second reservoir unit is discharged to the reference liquid level.

5. The cleaning liquid supplying apparatus according to claim 1, wherein the determination unit determines that the amount of air is abnormal when the amount of change in the pressure per unit time is greater than a predetermined pressure lowering threshold value in the accumulated pressure release.

6. The cleaning liquid supplying apparatus according to claim 5, wherein when at least one of the plurality of cleaning liquid ejecting units receives an instruction to eject the cleaning liquid while the cleaning liquid is discharged from the second reservoir unit, the control unit interrupts discharge of the cleaning liquid from the second reservoir unit and causes the cleaning liquid to be delivered to the second reservoir unit, regardless of whether or not the cleaning liquid in the second reservoir unit is discharged to the reference liquid level.

7. The cleaning liquid supplying apparatus according to claim 1, wherein the supply flow path is provided with a filter between the pump and the first reservoir unit, and the return flow path is coupled to the supply flow path between the filter and the first reservoir unit.

8. A liquid ejecting apparatus comprising:

the cleaning liquid supplying apparatus according to claim 1;

a plurality of liquid droplet ejecting heads each configured to eject a functional liquid and provided correspondingly to the plurality of cleaning liquid ejecting units; and a plurality of wiping apparatuses configured to wipe a nozzle surface of each of the liquid droplet ejecting heads, wherein each of the cleaning liquid ejecting units sprays a cleaning liquid to each of the liquid droplet ejecting heads.

9. A cleaning liquid supplying apparatus comprising:

a first reservoir unit configured to store a cleaning liquid;

a second reservoir unit of a pressure accumulation type configured to form an air reservoir inside when the second reservoir unit stores the cleaning liquid;

a communication flow path through which the first reservoir unit and the second reservoir unit communicate;

a reversible pump provided in the communication flow path and configured to deliver a liquid from the first reservoir unit to the second reservoir unit and deliver a liquid from the second reservoir unit to the first reservoir unit;

an atmospheric relief valve configured to open the second reservoir unit to an atmosphere;

a control unit configured to control the reversible pump and control pressure accumulation and accumulated pressure release in the second reservoir unit;

a plurality of cleaning liquid ejecting units configured to eject the cleaning liquid stored in the second reservoir unit;

a pressure detection unit configured to detect pressure inside the second reservoir unit; and a determination unit configured to determine abnormality in an amount of air in the second reservoir unit, based on an amount of change in the pressure per unit time, wherein when the determination unit determines that the amount of air is abnormal, after the cleaning liquid stored in the second reservoir unit is discharged to the first reservoir unit until a liquid level of the cleaning liquid stored in the second reservoir unit reaches a reference liquid level, the control unit causes the cleaning liquid to be delivered from the first reservoir unit to the second reservoir unit again.

10. A cleaning liquid supplying apparatus comprising:

a first reservoir unit configured to store a cleaning liquid;

a second reservoir unit of a pressure accumulation type configured to form an air reservoir inside when the second reservoir unit stores the cleaning liquid;

a supply flow path through which the cleaning liquid stored in the first reservoir unit is delivered to the second reservoir unit;

a first pump provided in the supply flow path;

a return flow path through which the cleaning liquid stored in the second reservoir unit is discharged to the first reservoir unit;

a second pump;

a flow path valve provided in the return flow path;

an atmospheric relief valve configured to open the second reservoir unit to an atmosphere;

a control unit configured to control the first pump, the second pump, the flow path valve, and the atmospheric relief valve and control pressure accumulation and accumulated pressure release in the second reservoir unit;

a plurality of cleaning liquid ejecting units configured to eject the cleaning liquid stored in the second reservoir unit;

a pressure detection unit configured to detect pressure inside the second reservoir unit; and a determination unit configured to determine abnormality in an amount of air in the second reservoir unit, based on an amount of change in the pressure per unit time, wherein when the determination unit determines that the amount of air is abnormal, after the cleaning liquid stored in the second reservoir unit is discharged to the first reservoir unit until a liquid level of the cleaning liquid stored in the second reservoir unit reaches a reference liquid level, the control unit causes the cleaning liquid to be delivered from the first reservoir unit to the second reservoir unit again.

11. The cleaning liquid supplying apparatus according to claim 10, wherein the second pump is provided in the return flow path.

12. The cleaning liquid supplying apparatus according to claim 10, further comprising an atmospheric relief path provided with the atmospheric relief valve, wherein the second pump is provided in the atmospheric relief path.

13. A method of controlling a cleaning liquid supplying apparatus including a cleaning liquid supplying apparatus including a first reservoir unit storing a cleaning liquid, a second reservoir unit of a pressure accumulation type forming an air reservoir inside when the second reservoir unit stores the cleaning liquid, a supply flow path through which the cleaning liquid stored in the first reservoir unit is delivered to the second reservoir unit, a pump provided in the supply flow path, a return flow path through which the cleaning liquid stored in the second reservoir unit is discharged to the first reservoir unit, a flow path valve provided in the return flow path, an atmospheric relief valve opening the second reservoir unit to an atmosphere, and a plurality of cleaning liquid ejecting units ejecting the cleaning liquid stored in the second reservoir unit, the first reservoir unit being provided at a position lower than a position of the second reservoir unit in a gravity direction, the method of controlling the cleaning liquid supplying apparatus comprising:

detecting pressure inside the second reservoir unit;

determining abnormality in an amount of air in the second reservoir unit, based on an amount of change in the pressure per unit time; and when the amount of air is determined to be abnormal, after the cleaning liquid stored in the second reservoir unit is discharged to the first reservoir unit until a liquid level of the cleaning liquid stored in the second reservoir unit reaches a reference liquid level, delivering the cleaning liquid from the first reservoir unit to the second reservoir unit again.

* * * * *